US011176677B2

(12) United States Patent
Fuchs et al.

(10) Patent No.: US 11,176,677 B2
(45) Date of Patent: Nov. 16, 2021

(54) DEEP INTERACTIVE LEARNING FOR IMAGE SEGMENTATION MODELS

(71) Applicant: MEMORIAL SLOAN KETTERING CANCER CENTER, New York, NY (US)

(72) Inventors: Thomas Fuchs, New York, NY (US); David Joon Ho, New York, NY (US)

(73) Assignee: MEMORIAL SLOAN KETTERING CANCER CENTER, New York, NY (US)

( * ) Notice: Subject to any disclaimer, the term of this patent is extended or adjusted under 35 U.S.C. 154(b) by 0 days.

(21) Appl. No.: 17/201,826

(22) Filed: Mar. 15, 2021

(65) Prior Publication Data

US 2021/0295528 A1    Sep. 23, 2021

Related U.S. Application Data

(60) Provisional application No. 62/990,185, filed on Mar. 16, 2020.

(51) Int. Cl.
*G06K 9/00* (2006.01)
*G06T 7/187* (2017.01)
(Continued)

(52) U.S. Cl.
CPC ............ *G06T 7/187* (2017.01); *G06K 9/6202* (2013.01); *G06K 9/6267* (2013.01); *G06T 7/11* (2017.01);
(Continued)

(58) Field of Classification Search
CPC ........ G06N 3/0454; G06N 3/08; G06N 20/00; G06N 3/084; G06N 7/005; G06N 3/0445;
(Continued)

(56) References Cited

U.S. PATENT DOCUMENTS 10,430,946 B1    10/2019  Zhou et al.
2011/0182493 A1   7/2011  Huber et al.
(Continued)

OTHER PUBLICATIONS

An, Medical Image Segmentation Algorithm Based on Feedback Mechanism CNN, Aug. 2019, Wiley (Year: 2019).*
(Continued)

*Primary Examiner* — Alex Kok S Liew
(74) *Attorney, Agent, or Firm* — Foley & Lardner LLP

(57) ABSTRACT

Described herein are systems and methods of training models to segment images. A device may identify a training dataset. The training dataset may include images each having a region of interest. The training dataset may include first annotations. The device may train, using the training dataset, an image segmentation model having parameters to generate a corresponding first segmented images. The device may provide the first segmented images for presentation on a user interface to obtain feedback. The device may receive, via the user interface, a feedback dataset including second annotations for at least a subset of the first segmented images. Each of the second annotations may label at least a second portion of the region of interest in a corresponding image of the subset. The device may retrain, using the feedback dataset received via the user interface, the image segmentation model.

20 Claims, 20 Drawing Sheets

(51) Int. Cl.
*G06T 7/11* (2017.01)
*G06K 9/62* (2006.01)
(52) U.S. Cl.
CPC ............... *G06T 2207/20081* (2013.01); *G06T 2207/30024* (2013.01); *G06T 2207/30096* (2013.01)
(58) Field of Classification Search
CPC ...... G06N 3/0472; G06N 3/088; G06N 20/10; G06N 5/04; G06N 3/04; G06N 20/20; G06N 5/003; G06N 3/006; G06N 3/0427; G06N 3/02; G06N 3/0481; G06T 2207/20081; G06T 7/0012; G06T 7/11; G06T 2207/10081; G06T 2207/10088; G06T 2200/24; G06T 11/008; G06T 2207/10116; G06T 2207/30168; G06T 7/0002; G06T 2200/16; G06T 2207/30196; G06T 7/70; G06T 19/20; G06T 2207/30096; G06T 7/0004; G06K 9/6256; G06K 9/00449; G06K 9/4628; G06K 9/00744; G06K 9/6217; G06K 9/6263; G06K 2209/01; G06K 2209/05; G06K 9/6262; G06K 9/6267; G06K 9/6271; G06K 2009/00644; G06K 2209/21
See application file for complete search history.

(56) References Cited

U.S. PATENT DOCUMENTS

| | | |
|---|---|---|
| 2018/0315188 A1 | 11/2018 | Tegzes et al. |
| 2018/0330238 A1* | 11/2018 | Luciw .................. G06K 9/6253 |
| 2019/0220701 A1 | 7/2019 | Novak et al. |

OTHER PUBLICATIONS

Zahed, Intelligent interaction and uncertainty visualization for efficient drusen and retinal layer segmentation in Optical Coherence Tomography, Jul. 2019, Elsevier (Year: 2019).*
International Search Report on non-Foley case related to PCT PCT/US2021/022391 dated Jun. 4, 2021.
Moradi et al., "Bimodal network architectures for automatic generation of image annotation from text", Sep. 6, 2018, Retrieved from the Internet: <URL:https://arxiv.org/pdf/1809.01610.pdf>, 8 pages.
Wei et al., "Learning to segment with image-level annotations", Pattern Recognition, 2016, pp. 234-244, vol. 59, 2016 Elsevier Ltd.
Arunachalam et al., "Viable and necrotic tumor assessment from whole slide images of osteosarcoma using machine-learning and deep-learning models", PLOS ONE, Apr. 17, 2019, pp. 1-19, vol. 14, No. 4.
Bándi et al., "From Detection of Individual Metastases to Classification of Lymph Node Status at the Patient Level: The CAMELYON17 Challenge", IEEE Transactions on Medical Imaging, Feb. 2019, pp. 550-560, vol. 38, No. 2.
Bankhead et al., "QuPath: Open source software for digital pathology image analysis", Scientific Reports, 2017, pp. 1-7, vol. 7.
Berg et al., "ilastik: interactive machine learning for (bio) image analysis", Nature Methods, Dec. 2019, pp. 1226-1232, vol. 16.
Bokhorst et al., "Learning from sparsely annotated data for semantic segmentation in histopathology images", Proceedings of Machine Learning Research, 2019, pp. 1-8.
Breiman, "Random Forests", Machine Learning, 2001, pp. 5-32, vol. 45, 2001 Kluwer Academic Publishers.
Bejnordi et al., "Diagnostic Assessment of Deep Learning Algorithms for Detection of Lymph Node Metastases in Women With Breast Cancer", The Journal of the American Medical Association, 2017, pp. 2199-2210, vol. 2017, No. 22, 2017 American Medical Association.
Fails et al., "Interactive Machine Learning", Proceedings of the International Conference on Intelligent User Interfaces, 2003, pp. 39-45.
Fu et al., "Nuclei Segmentation of Fluorescence Microscopy Images Using Convolutional Neural Networks", Proceedings of the IEEE International Symposium on Biomedical Imaging, 2017, pp. 704-708.
Fuchs et al., "Computational pathology: Challenges and promises fortissue analysis", Computerized Medical Imaging and Graphics, 2011, pp. 515-530, vol. 35, 2011 Elsevier Ltd.
Glorot et al., "Understanding the difficulty of training deep feedforward neural networks", Proceedings of the International Conference on Artificial Intelligence and Statistics, 2010, pp. 249-256.
Ho et al., "Deep Multi-Magnification Networks for Multi-Class Breast Cancer Image Segmentation", arXiv preprint, 2019, pp. 1-35.
Huvos et al., "Primary Osteogenic Sarcoma", Arch Pathol Lab Med, Jan. 1977, pp. 14-18, vol. 101.
Lee et al., "A Robust and Effective Approach Towards Accurate Metastasis Detection and pN-stage classification in Breast Cancer", Proceedings of the International Conference on Medical Image Computing and Computer-Assisted Intervention, 2018, pp. 1-8.
Long et al., "Fully Convolutional Networks for Semantic Segmentation", Proceedings of the IEEE Conference on Computer Vision and Pattern Recognition, 2015, pp. 3431-3440.
Ottaviani et al., "The Epidemiology of Osteosarcoma", Pediatric and Adolescent Osteosarcoma, 2009, pp. 3-13, Springer Science+Business Media, LLC.
Paszke et al., "PyTorch: An Imperative Style, High-Performance Deep Learning Library", Proceedings of the Neural Information Processing Systems, 2019, pp. 1-12.
Ronneberger et al., "U-Net: Convolutional Networks for Biomedical Image Segmentation", Proceedings of the International Conference on Medical Image Computing and Computer-Assisted Intervention, 2015, pp. 234-241.
Rosen et al., "Preoperative Chemotherapy for Osteogenic Sarcoma: Selection of Postoperative Adjuvant Chemotherapy Based on the Response of the Primary Tumor to Preoperative Chemotherapy", Cancer, 1982, pp. 1221-1230, vol. 49, American Cancer Society.
Schüffler et al., "TMARKER: A free software toolkit for histopathological cell counting and staining estimation", Journal of Pathology Informatics, 2013, pp. 1-6, vol. 4, No. 2.
Sommer et al., "Ilastik: Interactive Learning and Segmentation Toolkit", Proceedings of the IEEE International Symposium on Biomedical Imaging, 2011, pp. 230-2033.
Srinidhi et al., "Deep neural network models for computational histopathology: A survey", arXiv preprint, 2019, pp. 1-45.
Viray et al., "A Prospective, Multi-Institutional Diagnostic Trial to Determine Pathologist Accuracy in Estimation of Percentage of Malignant Cells", Archives of Pathology & Laboratory Medicine, Nov. 2013, pp. 1545-1549, vol. 137.
Wang et al., "Deep Learning for Identifying Metastatic Breast Cancer", arXiv preprint, arXiv, 2016, pp. 1-6.

* cited by examiner

DEEP INTERACTIVE LEARNING FOR IMAGE SEGMENTATION MODELS

CROSS-REFERENCE TO RELATED APPLICATIONS

The present application claims priority to U.S. Provisional Application No. 62/990,185, titled "Deep Interactive Learning for Image Segmentation Models," filed Mar. 16, 2020, which is incorporated herein by reference in its entirety.

STATEMENT OF GOVERNMENT SUPPORT

The invention was made with government support under P30-CA008748 awarded by the National Institute of Health/ National Cancer Institute (NIH/NCI). The government has certain rights to the invention.

BACKGROUND

Computer vision algorithms may be used to recognize and recognize various features on digital images. Training models for computer vision algorithms may consume a significant amount of time due to the enormous size of training data.

SUMMARY

At least one aspect of the present disclosure is directed to a method of training models to segment images. One or more processors may identify a training dataset. The training dataset may include a plurality of images each having a region of interest. The training dataset may include a plurality of first annotations. The one or more processors may train, using the training dataset, an image segmentation model having one or more parameters to generate a corresponding first plurality of segmented images. Each of the first plurality of segmented images may have a first area determined as corresponding to the region of interest and a second area determined as not corresponding to the region of interest in a corresponding image of the plurality of images. The one or more processors may provide the first plurality of segmented images generated from the training of the image segmentation model for presentation on a user interface to obtain feedback. The one or more processors may receive, via the user interface, a feedback dataset including a plurality of second annotations for at least a subset of the first plurality of segmented images. Each of the plurality of second annotations may label at least a second portion of the region of interest in a corresponding image of the subset. The one or more processors may retrain, using the feedback dataset received via the user interface, the image segmentation model to modify at least one of the one or more parameters and to generate a second plurality of segmented images corresponding to the subset.

In some embodiments, the one or more processors may provide the second plurality of segmented images generated from the retraining of the image segmentation model for presentation on the user interface for marking one or more portions in the second plurality of segmented image. In some embodiments, the one or more processors may receive a second feedback dataset including an indicator that retraining of the image segmentation is unsatisfactory and a plurality of third annotations for at least a subset of the second plurality of segmented images. In some embodiments, the one or more processors may determine, in response to receiving the indicator that the retraining is unsatisfactory, to retrain the image segmentation model using the plurality of third annotations and the subset of the second plurality of segmented images.

In some embodiments, the one or more processors may provide the second plurality of segmented images generated from the retraining of the image segmentation model for presentation on the user interface for marking one or more portions in the second plurality of segmented images. In some embodiments, the one or more processors may receive a second feedback dataset including an indicator that retraining of the image segmentation is satisfactory. In some embodiments, the one or more processors may determine, in response to receiving the indicator that the retraining is satisfactory, to terminate retraining of the image segmentation model and maintain the one or more parameters of the image segmentation model.

In some embodiments, the one or more processors may identify, in response to receiving an indicator that the retraining of the image segmentation model is satisfactory, a second plurality of images. Each of the second plurality of images may have a region of interest. In some embodiments, the one or more processors may apply the image segmentation model to the second plurality of images to generate a corresponding third plurality of segmented images. Each of the third plurality of segmented images may have a first area determined as corresponding to the region of interest and a second area determined as not corresponding to the region of interest.

In some embodiments, the one or more processors may generate, from at least one segmented image of the third plurality of segmented images, a set of image tiles each corresponding to a segment of the first area determined as corresponding to the region of interest. In some embodiments, the one or more processors may provide the set of image tiles generated from the at least one segmented image corresponding to the first area.

In some embodiments, the one or more processors may identify, from at least one segmented image of the third plurality of segmented images, a number of pixels in the first area determined as corresponding to the region of interest. In some embodiments, the one or more processors may compare the number of pixels in the first area to a threshold number for a condition associated with the region of interest. In some embodiments, the one or more processors may classify the at least one segmented image as associated with the condition responsive to determining that the number of pixels is greater than the threshold number.

In some embodiments, the training dataset may include at least one image of the plurality of images having a plurality of regions of interest. Each of the plurality of regions of interest may correspond to one of a plurality of conditions. In some embodiments, the training dataset may include an annotation of the plurality of first annotations for the at least one image. The annotation may label at least a portion of each of the regions of interest as a corresponding condition in the plurality of conditions.

In some embodiments, the training dataset may include the first plurality of images corresponding to a plurality of biomedical images. Each of the plurality of biomedical images may be derived from a tissue sample via a histopathological image preparer. Each of the plurality of biomedical images may have the region of interest corresponding to a feature on the tissue sample. In some embodiments, the training dataset may include the first plurality of annotations each labeling at least the first portion of the region of interest in a corresponding biomedical image of the plurality of biomedical images.

In some embodiments, providing the first plurality of segmented images for presentation may include providing the first plurality of segmented images for presentation on the user interface to indicate whether the training is satisfactory and to mark one or more portions in at least one of the first plurality of segmented images. In some embodiments, receiving the feedback dataset may include receiving the feedback dataset including an indicator that the training is unsatisfactory and the second plurality of annotations generated via marking at least the subset of the first plurality of segmented images. In some embodiments, training the image segmentation model may include establishing the image segmentation model having a set of transform layers. Each transform layer of the set may have the one or more parameters to process input image data.

At least one aspect of the present disclosure is directed to a system for training models to segment images. The system may include one or more processors. The one or more processors may identify a training dataset. The training dataset may include a plurality of images each having a region of interest. The training dataset may include a plurality of first annotations. The one or more processors may train, using the training dataset, an image segmentation model having one or more parameters to generate a corresponding first plurality of segmented images. Each of the first plurality of segmented images may have a first area determined as corresponding to the region of interest and a second area determined as not corresponding to the region of interest in a corresponding image of the plurality of images. The one or more processors may provide the first plurality of segmented images generated from the training of the image segmentation model for presentation on a user interface to obtain feedback. The one or more processors may receive, via the user interface, a feedback dataset including a plurality of second annotations for at least a subset of the first plurality of segmented images. Each of the plurality of second annotations may label at least a second portion of the region of interest in a corresponding image of the subset. The one or more processors may retrain, using the feedback dataset received via the user interface, the image segmentation model to modify at least one of the one or more parameters and to generate a second plurality of segmented images corresponding to the subset.

In some embodiments, the one or more processors may provide the second plurality of segmented images generated from the retraining of the image segmentation model for presentation on the user interface for marking one or more portions in the second plurality of segmented image. In some embodiments, the one or more processors may receive a second feedback dataset including an indicator that retraining of the image segmentation is unsatisfactory and a plurality of third annotations for at least a subset of the second plurality of segmented images. In some embodiments, the one or more processors may determine, in response to receiving the indicator that the retraining is unsatisfactory, to retrain the image segmentation model using the plurality of third annotations and the subset of the second plurality of segmented images.

In some embodiments, the one or more processors may provide the second plurality of segmented images generated from the retraining of the image segmentation model for presentation on the user interface for marking one or more portions in the second plurality of segmented images. In some embodiments, the one or more processors may receive a second feedback dataset including an indicator that retraining of the image segmentation is satisfactory. In some embodiments, the one or more processors may determine, in response to receiving the indicator that the retraining is satisfactory, to terminate retraining of the image segmentation model and maintain the one or more parameters of the image segmentation model.

In some embodiments, the one or more processors may identify, in response to receiving an indicator that the retraining of the image segmentation model is satisfactory, a second plurality of images. Each of the second plurality of images may have a region of interest. In some embodiments, the one or more processors may apply the image segmentation model to the second plurality of images to generate a corresponding third plurality of segmented images. Each of the third plurality of segmented images may have a first area determined as corresponding to the region of interest and a second area determined as not corresponding to the region of interest.

In some embodiments, the one or more processors may generate, from at least one segmented image of the third plurality of segmented images, a set of image tiles each corresponding to a segment of the first area determined as corresponding to the region of interest. In some embodiments, the one or more processors may provide the set of image tiles generated from the at least one segmented image corresponding to the first area.

In some embodiments, the one or more processors may identify, from at least one segmented image of the third plurality of segmented images, a number of pixels in the first area determined as corresponding to the region of interest. In some embodiments, the one or more processors may compare the number of pixels in the first area to a threshold number for a condition associated with the region of interest. In some embodiments, the one or more processors may classify the at least one segmented image as associated with the condition responsive to determining that the number of pixels is greater than the threshold number.

In some embodiments, the training dataset may include at least one image of the plurality of images having a plurality of regions of interest. Each of the plurality of regions of interest may correspond to one of a plurality of conditions. In some embodiments, the training dataset may include an annotation of the plurality of first annotations for the at least one image. The annotation may label at least a portion of each of the regions of interest as a corresponding condition in the plurality of conditions.

In some embodiments, the training dataset may include the first plurality of images corresponding to a plurality of biomedical images. Each of the plurality of biomedical images may be derived from a tissue sample via a histopathological image preparer. Each of the plurality of biomedical images may have the region of interest corresponding to a feature on the tissue sample. In some embodiments, the training dataset may include the first plurality of annotations each labeling at least the first portion of the region of interest in a corresponding biomedical image of the plurality of biomedical images.

In some embodiments, the one or more processors may provide the first plurality of segmented images for presentation on the user interface to indicate whether the training is satisfactory and to mark one or more portions in at least one of the first plurality of segmented images. In some embodiments, the one or more processors may receive the feedback dataset including an indicator that the training is unsatisfactory and the second plurality of annotations generated via marking at least the subset of the first plurality of segmented images. In some embodiments, the one or more processors may establish the image segmentation model having a set of transform layers. Each transform layer of the set may have the one or more parameters to process input image data.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Following below are more detailed descriptions of various concepts related to, and embodiments of, systems and methods for segmenting and classifying images. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes systems and methods for deep interactive learning for treatment response assessment;

Section B describes systems and methods for training image segmentation models using feedback and applying image segmentation models to segment images; and Section C describes a network environment and computing environment which may be useful for practicing various computing related embodiments described herein.

A. Deep Interactive Learning: An Efficient Labeling Approach for Deep Learning-Based Osteosarcoma Treatment Response Assessment Osteosarcoma is the most common malignant primary bone tumor where pre-operative chemotherapy followed by surgical resection is standard of care. The response to treatment as measured by ratio of necrotic tumor area to overall tumor area is a known prognostic factor for overall survival. This assessment is currently done manually by pathologists by looking at glass slides under the microscope which may not be reproducible due to its subjective nature. Convolutional neural networks (CNNs) can be used for automated segmentation of viable and necrotic tumor on osteosarcoma whole slide images. One bottleneck for supervised learning is that large amounts of accurate annotations are required for training which is a time-consuming and expensive process.

Presented are Deep Interactive Learning (DIaL) as an efficient labeling approach for training CNNs. After an initial labeling step is done, annotators only need to correct mislabeled regions from previous segmentation predictions to improve the CNN model until the satisfactory predictions are achieved. The experiments show that the CNN model trained by only 7 hours of annotation using DIaL can successfully estimate ratios of necrosis within expected inter-observer variation rate for non-standardized manual surgical pathology task. Digital and computational pathology may enable use of a large dataset for investigating pancreatic cancer such as subtyping and outcome prediction. Automated tumor segmentation may be a prerequisite step but requires lots of manual tumor and non-tumor annotation to train a machine learning model. Deep Interactive Learning (DIaL) may be used to minimize pathologists' annotation time by iteratively annotating mislabeled regions to improve a model. DIaL may be used with a pretrained model from a different cancer type to reduce manual training annotation on pancreatic pathology images.

Figure 1:
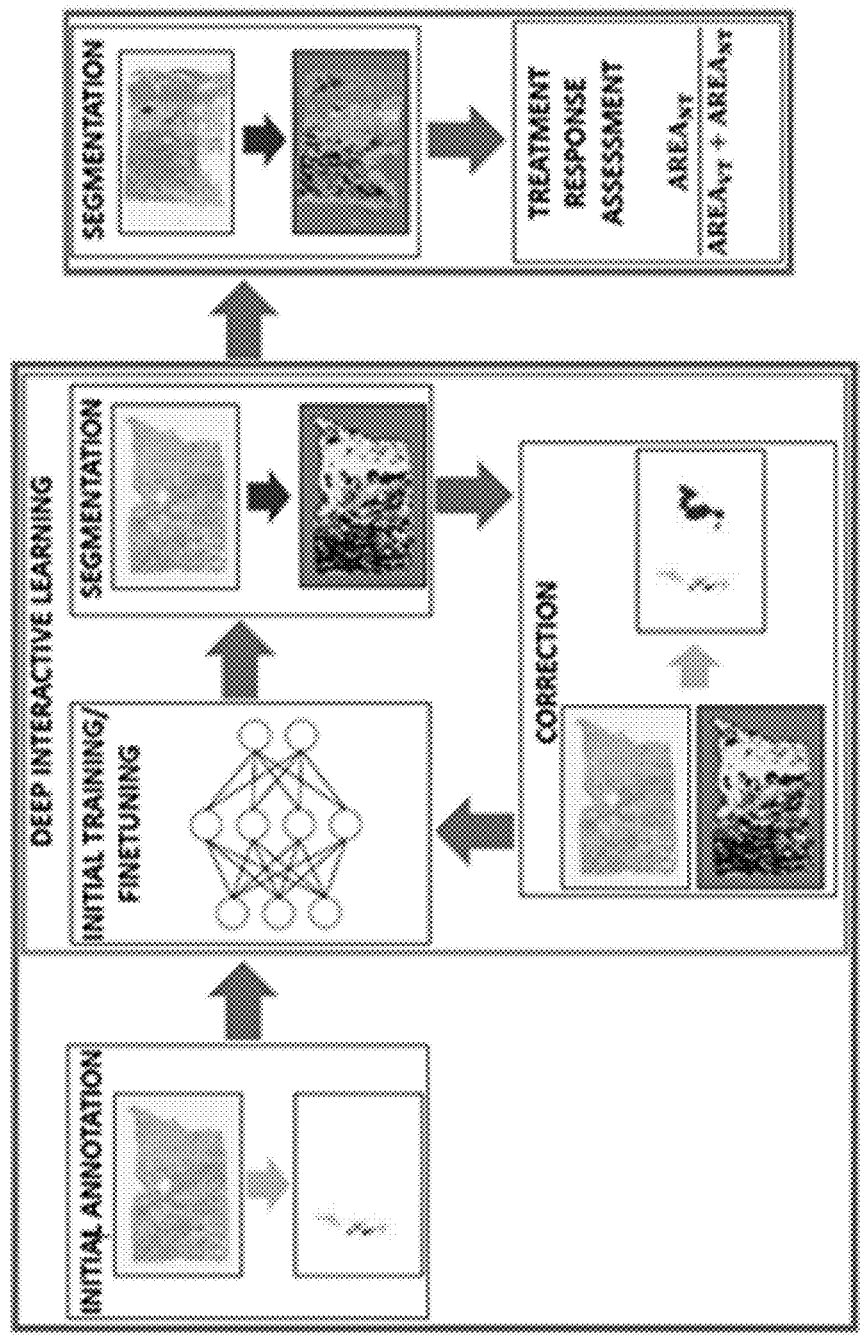
FIG. 1 depicts a block diagram of deep interactive learning. First of all, initial annotation is done on training whole slide images (WSIs) where characteristic features of each class are partially annotated. The annotated regions are used to train a Deep Multi-Magnification Network. Segmentation is done on the same training WSIs to correct any mislabeled regions containing challenging or rare features. These corrected regions are added to the training set to finetune the model. This training-segmentation-correction iteration, denoted as Deep Interactive Learning (DIaL), is repeated until segmentation predictions are satisfied by annotators. The final model is used to segment testing WSIs to assess treatment responses.

Manual labelling of osteosarcoma whole slide images (WSIs) may be used to supervise training of a segmentation convolutional neural network (CNN) for automated treatment response assessment. Labeling WSIs exhaustively would be ideal but such labeling may entail tremendous labeling time. Partial labeling approaches are introduced to reduce labeling time, but challenging or rare morphological features can be missed. Proposed herein is Deep Interactive Learning (DIaL) to efficiently annotate WSIs to have outstanding segmentation performance. The block diagram is shown in FIG. 1. First of all, initial annotation is partially done mainly on characteristic features of classes. During DIaL, training a CNN, segmentation prediction, and correction on mislabeled regions are repeated to improve segmentation performance until segmentation predictions on training images are satisfied by the annotators. Note that challenging or rare features would be labeled during the correction step. When training the CNN is finalized, the CNN is used to segment viable tumor and necrotic tumor on testing cases to assess treatment responses.

Figure 2A:
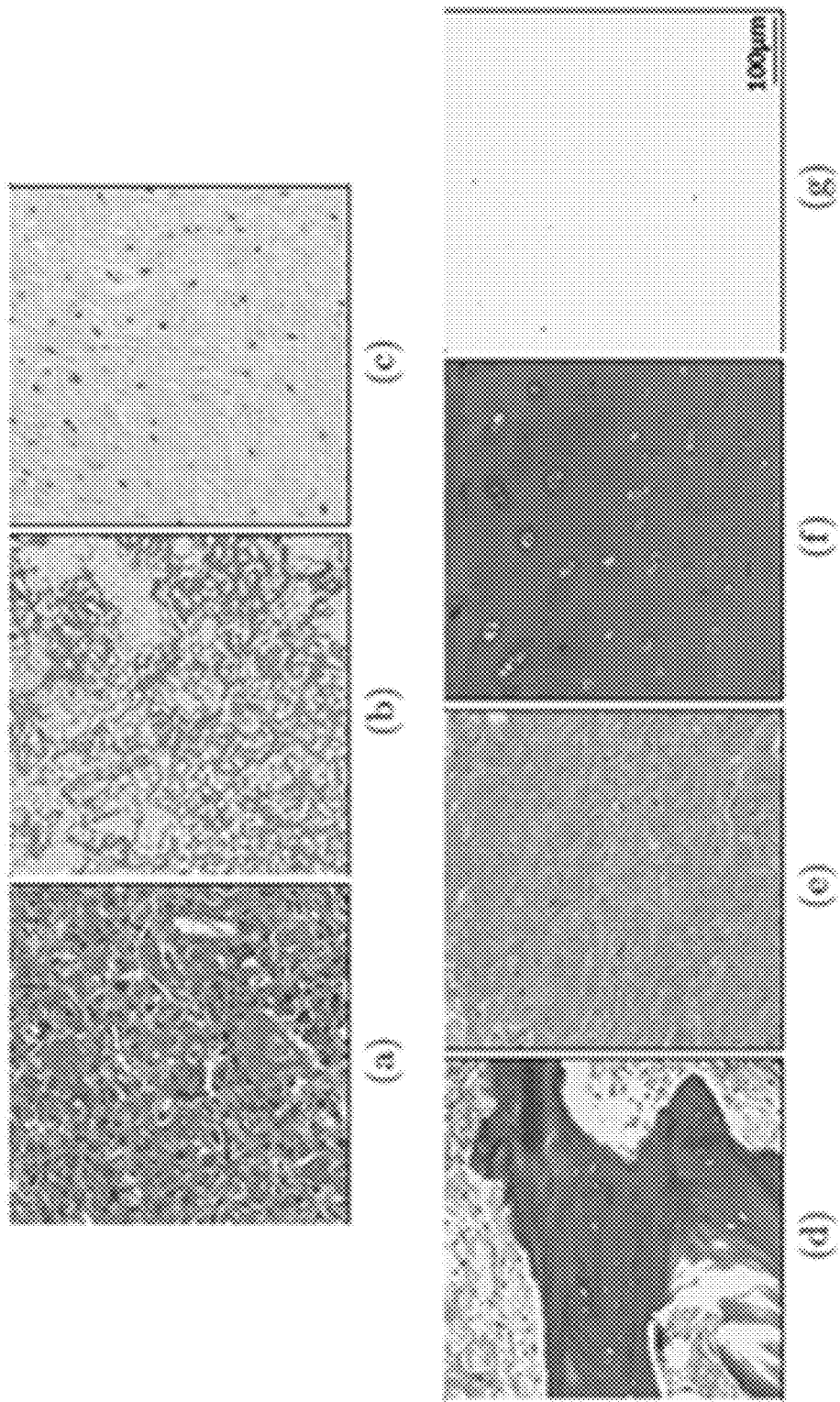
FIG. 2A depicts example images. A convolutional neural network can predict 7 classes: (a) viable tumor, (b) necrosis with bone, (c) necrosis without bone, (d) normal bone, (e) normal tissue, (f) cartilage, and (g) blank. The goal is to accurately segment viable tumor and necrotic tumor on osteosarcoma whole slide images for automated treatment response assessment.

Initial annotation on characteristic features of each class is done to train an initial CNN model. Annotators label 7 morphologically distinct classes, shown in FIG. 2A. Viable tumor, necrosis with bone, necrosis without bone, normal bone, normal tissue, cartilage, and blank. Note initial annotation is partially done on training images.

During initial annotation, challenging or rare features may not be included in the training set which can lead to mislabeled predictions. These challenging features can be added into the training set through Deep Interactive Learning (DIaL) by repeating the following three steps: training, segmentation, and correction. These three steps are repeated until annotators are satisfied with segmentation predictions on training images.

Initial Training: initially trained model to annotate mislabeled regions with challenging features. WSIs are too large to be processed at once. Thus, the labeled regions are extracted into 256×256 pixels patches only when 1% of pixels in the patch are annotated. To balance the number of pixels between classes, patches containing rare classes are deformed to produce additional patches done by elastic deformation. Here, a class may be defined as rare rare if the number of pixels in the class is less than 70% of the maximum number of pixels among classes. After patch extraction and deformation are done, some cases are separated for validating the CNN model where approximately 20% of pixels in each class are separated. A Deep Multi-Magnification Network (DMMN) may be used for multi-class tissue segmentation where the model looks at patches in multiple magnifications for accurate predictions. Specifically, DMMN is composed of three half-channeled U-Nets, U-Net-20×, U-Net-10×, and U-Net-5×, where in-put patches of these U-Nets are in 20×, 10×, and 5× magnifications, respectively, with size of 256×256 pixels centered at the same location. Intermediate feature maps in decoders of U-Net-10× and U-Net-5× are center-cropped and concatenated to a decoder of U-Net-20× to enrich feature maps. The final prediction patch of DMMN is generated in size of 256×256 pixels in 20× magnification. To train the model, weighted cross entropy was used as the loss function where a weight for class c, $w_c$, is defined as $$w_c = 1 - \frac{p_c}{\sum_c c}$$

were C=7 is the $P_c$ total number of classes and $p_c$ is the number of pixels in class c. Note that unlabeled regions do not contribute to the training process. During training, random rotation, vertical and horizontal flip, and color jittering are used as data augmentation. Stochastic gradient descent (SGD) optimizer with a learning rate of $5 \ 10^{-5}$, a momentum of 0.99, and a weight decay of $10^{-4}$ is used for 30 epochs. In each epoch, a model is validated by mean Intersection-Over-Union (mIOU) and the model with the highest mIOU is selected as an output model.

Segmentation: after training a model is done, all training WSIs are processed to evaluate unlabeled regions. A patch with size of 256×256 pixels in 20× magnification with the corresponding patches in 10× and 5× magnifications centered at the same location is processed using the DMMN. Note that zero-padding is done on the boundary of WSIs. Patch-wise segmentation is repeated in x and y-directions with a stride of 256 pixels until the entire WSI is processed.

Correction Characteristic features are annotated during initial annotation, but challenging or rare features may not be included. During the correction step, these challenging features that the model could not predict correctly are annotated to be included in the training set to improve the model. In this step, the annotators look at segmentation predictions and correct any mislabeled regions. If the predictions are satisfied throughout training images, the model is finalized.

Fine-tuning Assuming the previous CNN model has already learned most features of classes, the previous mode may be fin tuned to improve segmentation performance. Corrected regions are extracted into patches and included in the training set to improve the CNN model. Additional patches are generated by deforming the extracted patches to give a higher weight on challenging and rare features to emphasize these features to be learned during fine-tuning. SGD optimizer and weighted cross entropy with the updated weights are used during training, and a learning rate may be reduced to be $5 \times 10^{-6}$ and the number of epochs to be 10 not to perturb parameters of the CNN model too much from the previous model.

Note validation cases can be selected again to utilize the majority of corrected cases for the optimization.

The final CNN model segments viable tumor and necrotic tumor on testing WSIs. Note necrotic tumor is a combination of necrosis with bone and necrosis without bone. The ratio of necrotic tumor to overall tumor in case-level estimated by a deep learning model, RDL, is defined as $$R^{DL} = \frac{p_{NT}}{p_{VT} + p_{NT}} \quad (1)$$

where $p_{VT}$ and $p_{NT}$ are the number of pixels of viable tumor and necrotic tumor, respectively.

Figure 4:
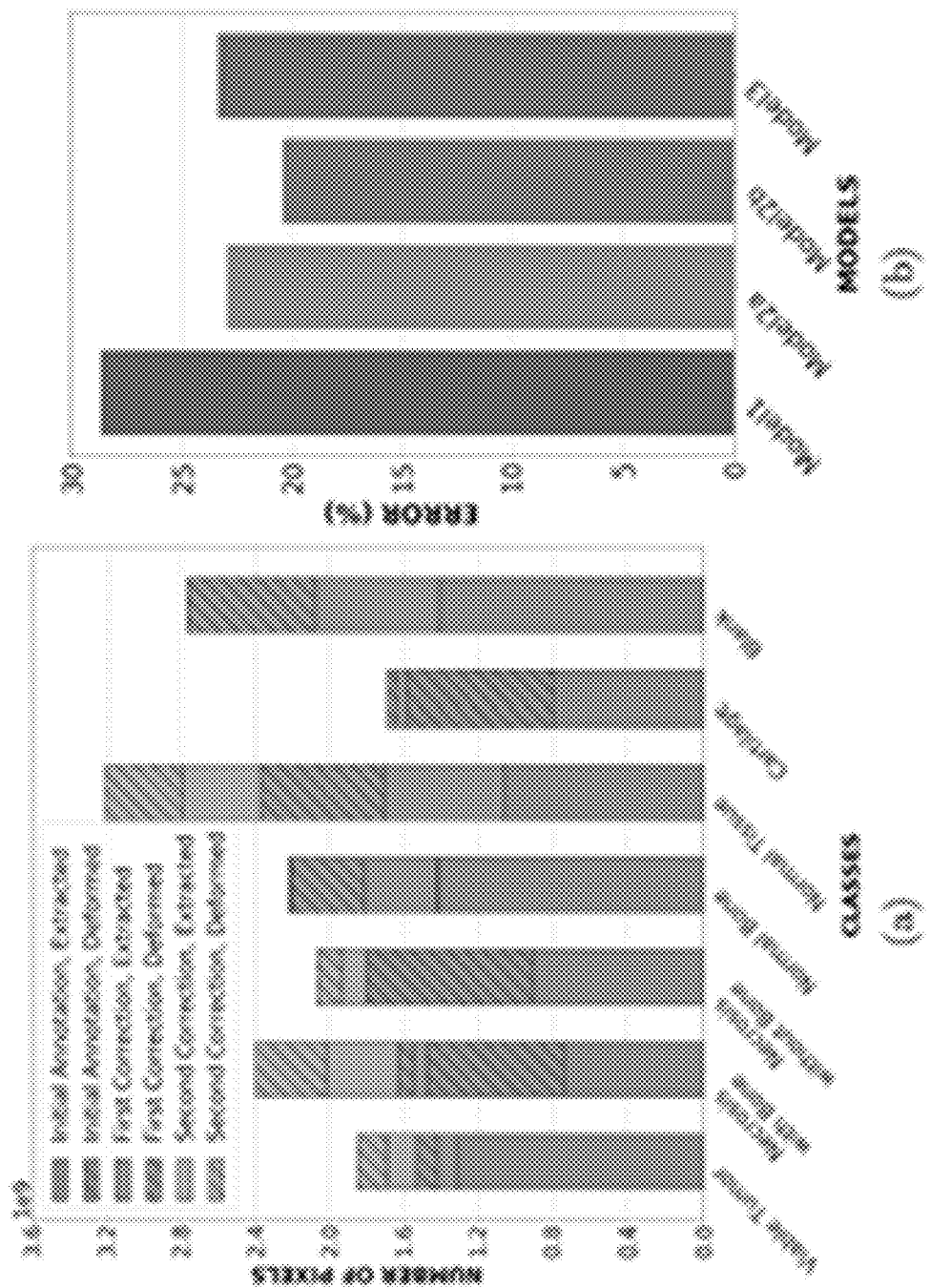
FIG. 4 depicts graphs. (a) The number of pixels in a training set for each class. During initial an-notation, elastic deformation is used on patches containing necrosis with bone, necrosis without bone, and cartilage to balance the number of pixels between classes. Elastic deformation is used on all correction patches to give a higher weight on them. (b) Error rates of Model1, trained by initial annotations alone, Model2a, fine-tuned from Model1 with single-weighted first correction, Model2b, fine-tuned from Model1 with double-weighted first correction, and Model3, fine-tuned from Model2b with double-weighted second correc-tion. The final model, Model2b, achieves the error rate of 20% considered as an expected inter-observer variation rate.

The hematoxylin and eosin (H&E) stained osteosarcoma dataset is digitized in 20 magnification by two Aperio AT2 scanners at Memorial Sloan Kettering Cancer Center where microns per pixel (MPP) for one scanner is 0.5025 and MPP for the other scanner is 0.5031. The osteosarcoma dataset contains of 55 cases with 1578 whole slide images (WSIs) where the number of WSIs per case ranges between 1 to 109 with mean of 28.7 and median of 22, and the average width and height of the WSIs are 61022 pixels and 41518 pixels, respectively. Thirteen cases may be used for training and the other 42 cases for testing. Note 8 testing cases do not contain the necrosis ratio on their pathology reports, so 34 cases were used for evaluation. Two annotators selected 49 WSIs from 13 training cases and independently annotated them without case-level overlaps. The pixel-wise annotation was performed on an in-house WSI viewer, allowing measuring the time taken for annotation. The annotators labeled three iterations using Deep Interactive Learning (DIaL): initial annotation, first correction, and second correction. They annotated 49 WSIs in 4 hours, 37 WSIs in 3 hours, and 13 WSIs in 1 hour during the initial annotation, the first correction, and the second correction, respectively. The annotators also exhaustively labeled the entire WSI which took approximately 1.5 hours. With the same given time, the annotators would be able to exhaustively annotate only 5 WSIs without DIaL. The annotators can annotate more diverse cases with DIaL. The number of pixels annotated and deformed are shown in FIG. 4(a). The implementation was done using PyTorch and an Nvidia Tesla V100 GPU is used for training and segmentation. Initial training and fine-tuning took approximately 5 days and 2 days, respectively. Segmentation of one WSI took approximately 20~25 minutes.

For evaluating the segmentation model, 1044 WSIs from 34 cases were segmented to estimate the necrosis ratio. Note all WSIs were segmented as if pathologists look at all glass slides under the microscope. To numerically evaluate the estimated necrosis ratio, the ratio may be compared from pathology reports written by experts. Here, the error rate, E, is defined as:

$$E = \frac{1}{N} \sum_{i=1}^{N} |R_i^{PATH} - R_i^{DL}| \quad (2)$$

Where $R_i^{PATH}$ is the ratio from a pathology report and RDL estimated by a deep learning model for the i-th case, and $1 \leq i \leq N$ where N=34 is the number of testing cases. FIG. 4(b) shows the error rates for these three models. Model1, Model2a, Model2b, Model3 denote an initially-trained model, a fine-tuned model from Model1 with single-weighted first correction, a fine-tuned model from Model1 with double-weighted first correction, and a fine-tuned model from Model2b with double-weighted second correction, respectively. Note that both single-weighted correction including only extracted correction patches and double-weighted correction including both extracted correction patches and their corresponding deformed patches were tried during the fine-tuning step. It is observed that the error rate decreases after the first correction, especially with a higher weight on correction patches to emphasize challenging features. Model2b was selected as the final model because the error rate stopped converging after the second correction. The final model, trained by only 7 hours of annotations done by DIaL, was able to achieve the error rate of 20%, where a 20% inter-observer error rate is considered acceptable for non-standardized tasks in surgical pathology. The task of manual quantification of the necrosis ratio done by pathologists is challenging because an estimate across multiple glass slides may be made that may differ substantially in the ratio of necrosis. The objective and reproducible deep learning model estimating the necrosis ratio within expected inter-observer variation rate can be superior to manual interpretation.

Figure 2B:
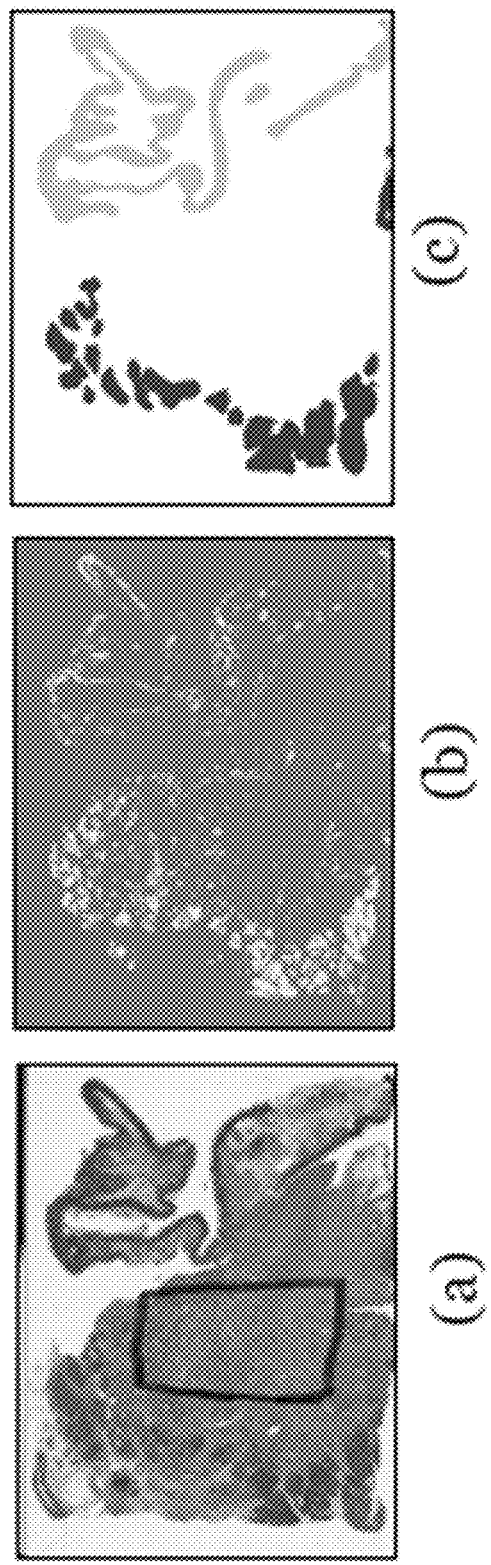
FIG. 2B depicts example images. An example of the first correction. (a) A pancreas whole slide image (b) tumor segmentation by the pretrained model (c) correction on false positive regions.
Figure 3A:
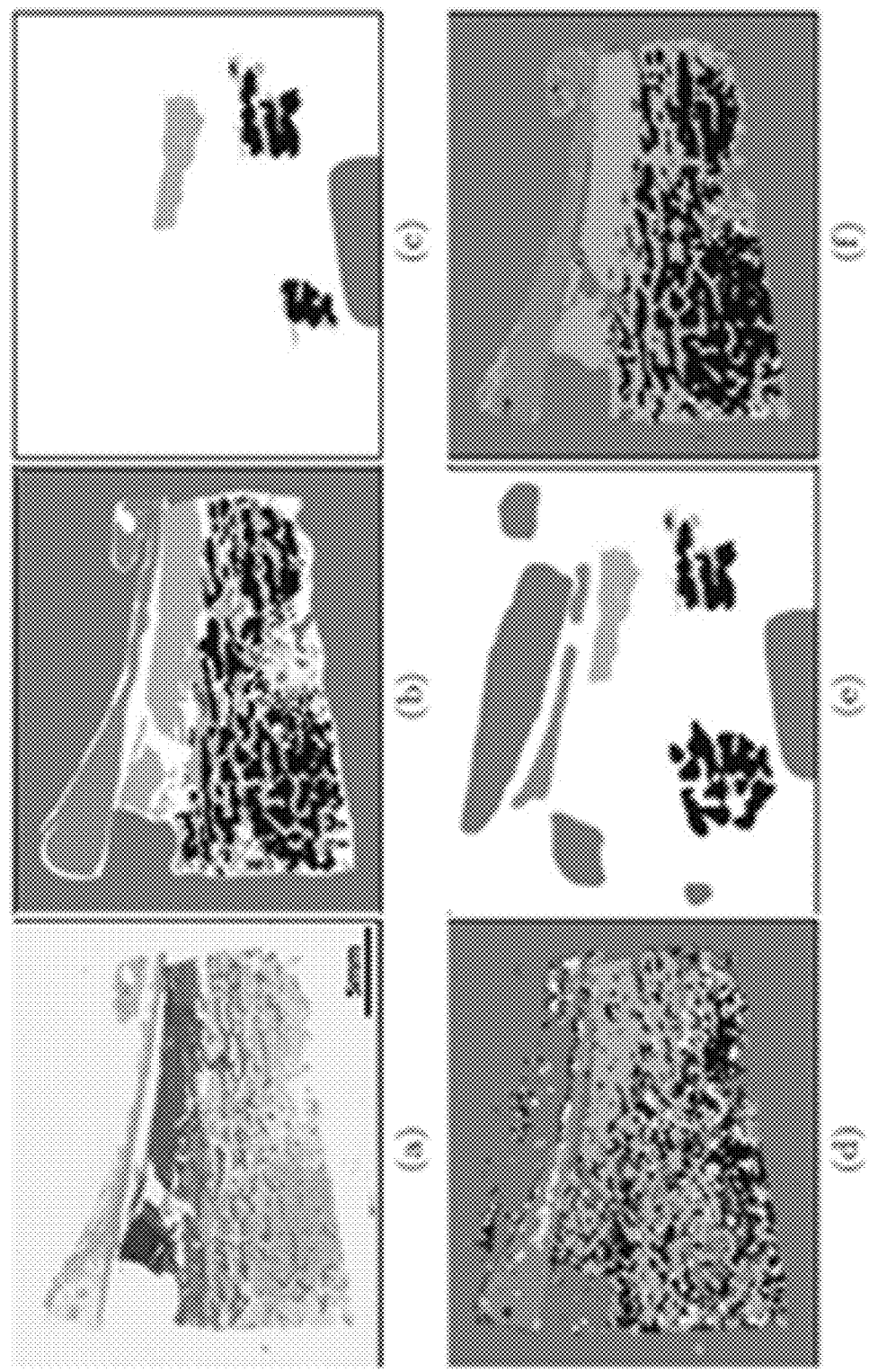
FIG. 3A depicts example images. An example of Deep Interactive Learning (DIaL). (a) An original training whole slide image, (b) an exhaustive annotation, (c) an initial annotation, (d) the first prediction from a CNN trained by the initial annotation, (e) the first correction where more necrosis with bone regions, normal tissue regions, and blank regions are labeled to correct the first prediction, (f) the second prediction from a CNN fine-tuned from the initial model with double-weighted first correction. Annotators spent approximately 1.5 hours to exhaustively label a whole slide image. With DIaL, the annotators are able to efficiently label characteristic features and challenging features on more diverse cases at the same given time. Note viable tumor, necrosis with bone, necrosis without bone, normal bone, normal tissue, cartilage, and blank are labeled. White regions in (b), (c), and (e) are unlabeled regions.
Figure 3B:
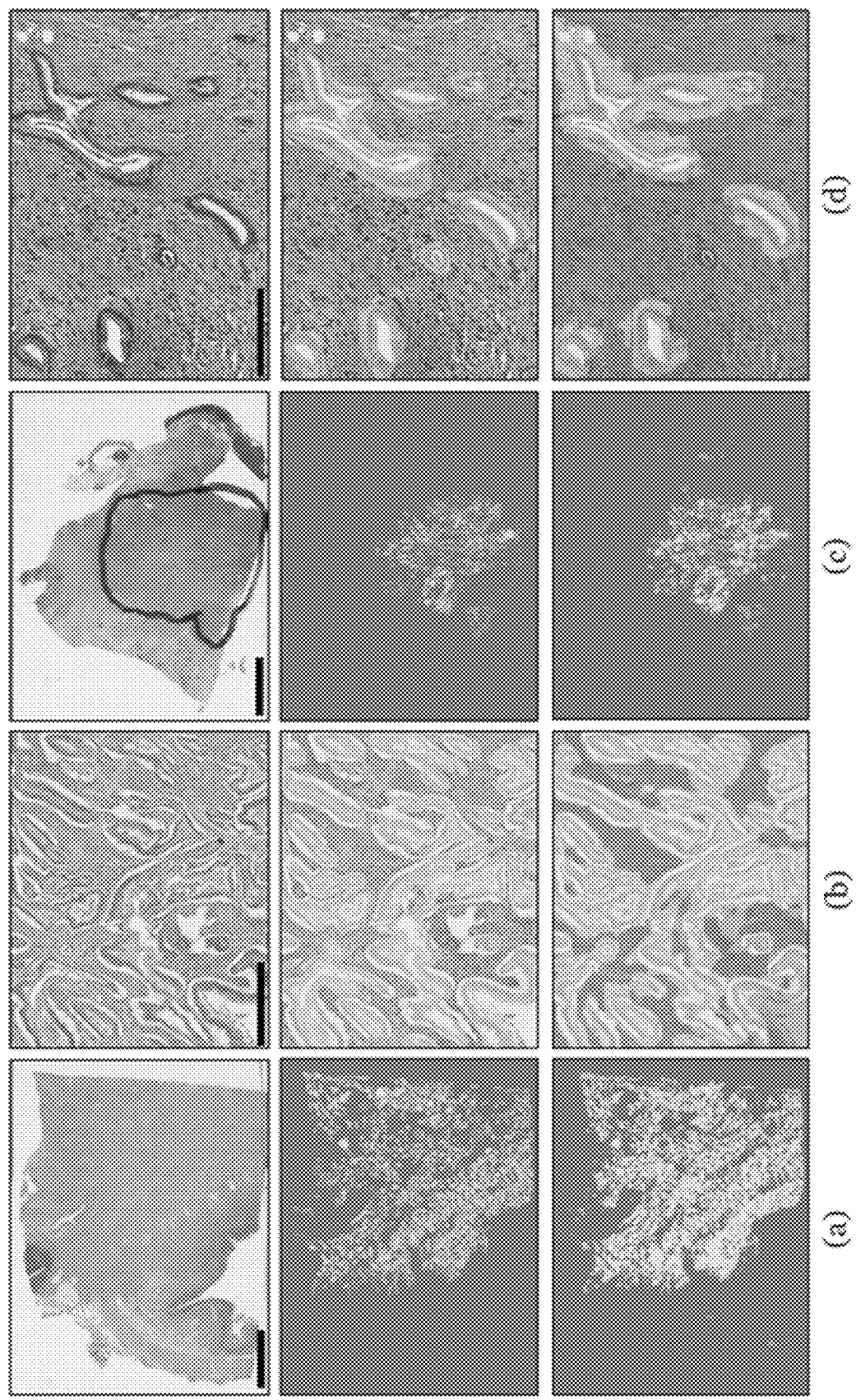
FIG. 3B depicts example images. Original images (the first row), groundtruth images (the second row), and segmentation images (the last row). (a,c) show pancreas whole slide images and (b,d) show zoom-in images, respectively. Scale bar: (a) 5 mm, (b) 500 µm, (c) 5 mm, (d) 200 µm.

In one test run, the cohort contained 759 cases with pancreatic ductal adenocarcinomas whose primary sites are pancreas. 14 whole slide images for training, and 23 whole slide images for numerical evaluation. A pretrained breast model was fine-tuned using DIaL to segment pancreatic carcinomas. During the first iteration, a pathologist annotated false positives on non-tumor subtypes that are not presented on breast training images. The first correction took an hour (example depicted in FIG. 2B). During the second iteration, the pathologist annotated false negatives on pancreatic carcinomas. The second correction took two hours. The pathologist spent total 3 hours to annotate 14 pancreatic pathology images. For numerical evaluation, 23 other images balanced between well-differentiated, moderately differentiated, and poorly differentiated cases were selected and exhaustively annotated by another pathologist. The results were quantified using the following statistics:

$$\text{Precision} = \frac{N_{TP}}{N_{TP} + N_{FP}}$$

$$\text{Recall} = \frac{N_{TP}}{N_{TP} + N_{FN}}$$

$$IOU = \frac{N_{TP}}{N_{TP} + N_{FP} + N_{FN}}$$

Where $N_{TP}$ is the number of true-positive pixels, $N_{FP}$ is the number of false-positive pixels, and $N_{FN}$ is the number of false-negative pixels. Using the above statistics, precision yielded 0.621, recall yielded 0.748, and intersection-over-union (IOU) yielded 0.513.

Presented herein is Deep Interactive Learning (DIaL) for an efficient annotation to train a segmentation CNN. With 7 hours of annotations, a well-trained CNN segmenting viable tumor and necrotic tumor on osteosarcoma whole slide images was achieved. These experiments showed that the CNN model can successfully estimate the necrosis ratio known as a prognostic factor for patients' survival for osteosarcoma in an objective and reproducible way.

Figure 5A:
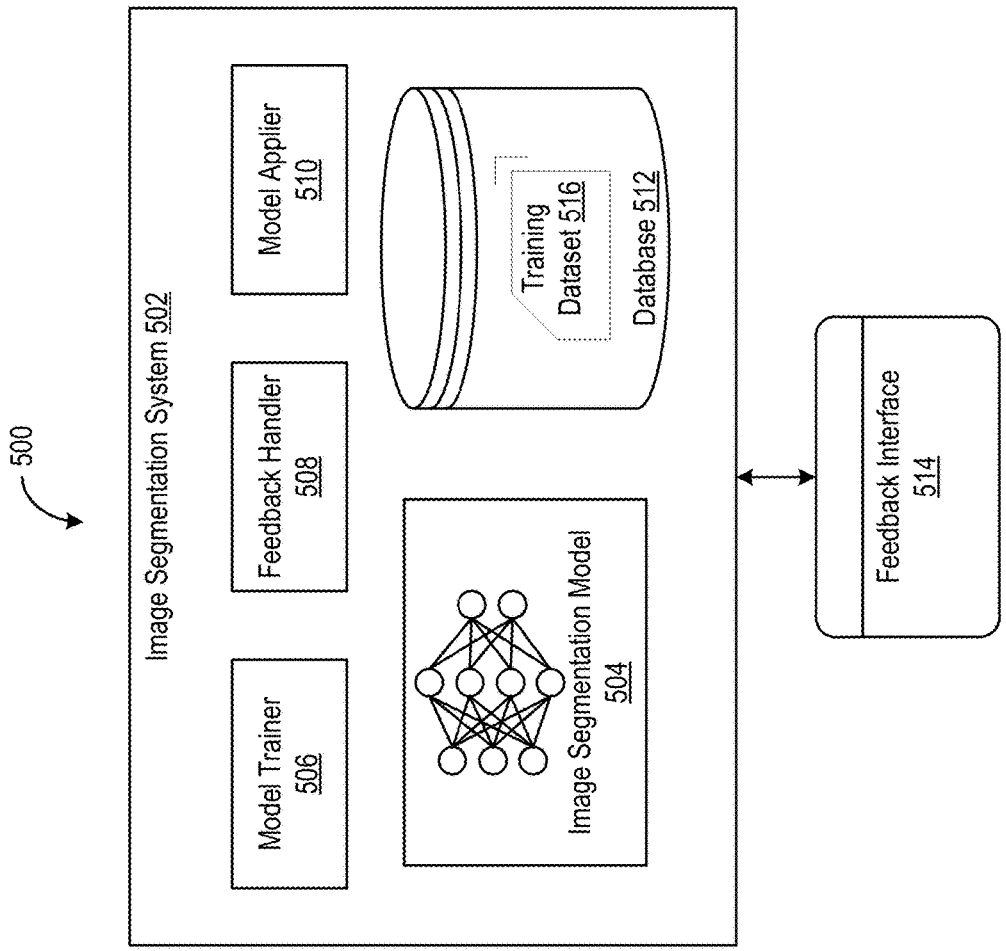
FIG. 5A depicts a block diagram of a system for training models to segment images and applying models to segment image, in accordance with an illustrative embodiment.

B. Systems and Methods for Training Image Segmentation Models Using Feedback and Applying Models to Segment Images Referring now to FIG. 5A, depicted is a block diagram of a system 500 for training image segmentation models using feedback and applying image segmentation models to segment images. In overview, the system 500 may include at least one image segmentation system 502. The image segmentation system 502 may include at least one image segmentation model 504, at least one model trainer 506, at least one feedback handler 508, at least one model applier 510, at least one database 512, and at least one feedback interface 514. The database 512 may store, maintain, or include at least one training dataset 516. Each of the components in the system 500 (e.g., the image segmentation model 504, the model trainer 506, the feedback handler 508, the model applier 510, and the database 512) may be executed, processed, or implemented using hardware or a combination of hardware and software, such as the system 800 detailed herein in Section C.

The image segmentation model 504 maintained by the image segmentation system 502 may convert at least one image into a segmented image showing one or more partitions to identify various regions of interest from the input image. The image segmentation model 504 may be any type of machine learning algorithm or model to generate segmented images, such as a thresholding algorithm (e.g., Otsu's method), a clustering algorithm (e.g., k-means clustering), an edge detection algorithm (e.g., Canny edge detection), a region growing technique, a graph partitioning method (e.g., a Markov random field), and an artificial neural network (e.g., convolutional neural network architecture), among others. For example, the image segmentation model 504 may be have the architecture of the model 600 detailed herein in conjunction with FIG. 6.

In general, the image segmentation model 504 may have at least one input and at least one output. The output and the input may be related via a set of parameters. The input may include at least one input image (or a feature space representation) to be processed by the image segmentation model 504. The output may include at least one segmented image (or a corresponding feature space representation) generated from the application of the image segmentation model 504 onto the input image in accordance with the set of parameters. The set of parameters may define corresponding weights to be applied in converting the input image to generate the output image. In some embodiments, the set of parameters may be arranged in one or more transform layers. Each layer may specify a combination or a sequence of application of the parameters to the input and resultant. The layers may be arranged in accordance with the machine learning algorithm or model for the image segmentation model 504. For example, the set of parameters may correspond to values of weights in the layers of convolutional blocks in the model 600 described below in conjunction with FIG. 6.

The image segmentation system 502 itself and the components therein, such as the model trainer 506, the feedback handler 508, and the model applier 510, may have a runtime mode (sometimes referred herein as an evaluation mode) and a training mode. Under training mode, the image segmentation system 502 may train the image segmentation model 504 using the training dataset 516. Under runtime mode, the image segmentation system 502 may apply the image segmentation model 504 to acquired images to generate segmented image.

Figure 5B:
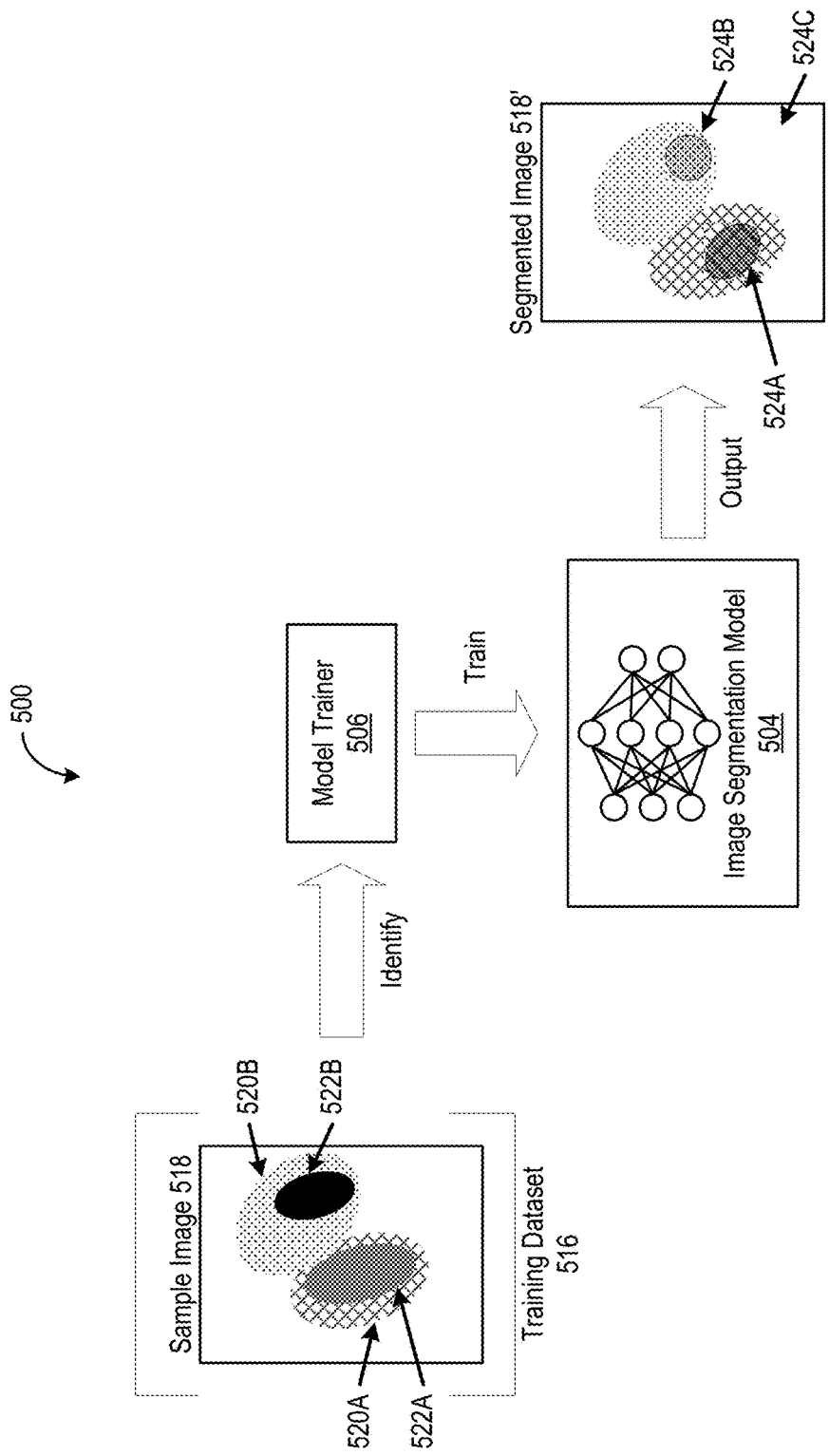
FIG. 5B depicts an activity diagram of the system for training models to segment images using training datasets, in accordance with an illustrative embodiment.

Referring now to FIG. 5B, depicted is an activity diagram of the system 500 for training image segmentation models using training data. The training dataset 516 maintained on the database 512 may include one or more sample images 518 to train the image segmentation model 504. In some embodiments, each sample image 518 of the training dataset 516 may be a biomedical image. The biomedical image may be acquired in accordance with microscopy techniques or a histopathological image preparer, such as using an optical microscope, a confocal microscope, a fluorescence microscope, a phosphorescence microscope, an electron microscope, among others. The biomedical image may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The biomedical image for the sample image 518 may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject. The sample image 518 of the training dataset 516 may be another type of image.

Each sample image 518 of the training dataset 516 may include one or more regions of interest 520A and 520B (hereinafter generally referred as regions of interest 520). Each region of interest 520 may correspond to areas, sections, or boundaries within the sample image 518 that contain, encompass, or include conditions (e.g., features or objects within the image). For example, the sample image 518 may be a whole slide image (WSI) for digital pathology of a sample tissue, and the region of interest 520 may correspond to areas with lesions and tumors in the sample tissue. In some embodiments, the regions of interest 520 of the sample image 518 may correspond to different conditions. Each condition may define or specify a classification for the region of interest 520. For example, when the sample image 518 is a WSI of the sample tissue, the conditions may correspond to various histopathological characteristics, such as carcinoma tissue, benign epithelial tissue, stroma tissue, necrotic tissue, and adipose tissue, among others. In the depicted example, the first region of interest 520A may be associated with one condition (e.g., stroma tissue) and the second region of interest 520B may be associated with another condition (e.g., carcinoma tissue).

Furthermore, each sample image 518 may include or be associated with one or more annotations 522A and 522B (hereinafter generally referred as annotation 522). Each annotation 522 may indicate or label at a portion of one of the regions of interest 520 within the sample image 518. Each annotation 522 may be at least partially manually prepared by a viewer examining the sample image 518 for conditions. For example, a pathologist examining the biomedical image within the sample image 518 may manually label the regions of interest 520 using the annotations 522 via a computing device. The annotations 522 may indicate, specify, or define an area, dimensions, or coordinates (e.g., using pixel coordinates) of the regions of interest 520 within the sample image 518. In some embodiments, each annotation 522 may identify or indicate different conditions associated with the region of interest 520. For example, when the sample image 518 is a WSI of the sample tissue, the annotation 522 may identify one of the various histopathological characteristics, such as carcinoma tissue, benign epithelial tissue, stroma tissue, necrotic tissue, and adipose tissue, among others. In the depicted example, the first annotation 522A may be associated with one condition (e.g., stroma tissue) corresponding to the first region of interest 520A. Furthermore, the second region of interest 520B may be associated with another condition (e.g., carcinoma tissue) corresponding to the second region of interest 520B.

In some embodiments, the annotations 522 may fully label or partially label (e.g., as depicted) the corresponding region of interest 520 within the sample image 518. When fully labeled, the annotation 522 may cover or substantially cover (e.g., 80% or above) the corresponding region of interest 520 within the sample image 518. Conversely, when partially labeled, the annotation 522 may define a portion of the region of interest 520 (less than fully) within the sample image 518. In addition, the portion defined by each annotation 522 may be separated from at least one edge of the region of interest 520. The edge may define a perimeter or a boundary between two or more regions of interest 520. The annotation 522 may be separated or arranged from the edge by a separation distance. By partially labeling the regions of interest 520 using the annotations 522, the time consumed in generation of annotations 522 may be reduced.

The model trainer 506 executing on the image segmentation system 502 may train the image segmentation model 504. The training of the image segmentation model 504 may be performed when the image segmentation system 502 is in training mode. In training, the model trainer 506 may establish the image segmentation model 504. The establishment of the image segmentation model 504 may be in accordance with the machine learning algorithm or model to segment images. In some embodiments, the model trainer 506 may initialize the one or more parameters of the image segmentation model 504. For example, the model trainer 506 may assign random values to the parameters of the image segmentation model 504. The initialization of the parameters of the image segmentation model 504 may be in accordance with the machine learning algorithm or model to segment images.

The model trainer 506 may use the training dataset 516 maintained on the database 512. From the training dataset 516, the model trainer 506 may identify each sample image 518 and the one or more annotations 522 associated with the sample image 518. With the identification, the model trainer 506 may apply the image segmentation model 504 to the sample image 518 to generate a corresponding segmented image 518'. In applying, the model trainer 506 may feed the sample image 518 as input into the image segmentation model 504 in accordance with the machine learning algorithm or model. In some embodiments, the model trainer 506 may pre-process the sample image 518 prior to feeding into the image segmentation model 504 in accordance with input specifications of the image segmentation model 504. For example, the image segmentation model 504 may be in accordance with the model 400 detailed in FIG. 4. For the model 400, the model trainer 506 may generate a set of image tiles from the sample image 518 at different magnification factors and then input the set of image tiles into the image segmentation model 504. The model trainer 506 may also process the input sample image 518 using the one or more parameters of the image segmentation model 504 in accordance with the machine learning algorithm or model.

By applying the image segmentation model 504 to the sample image 518 of the training dataset 516, the model trainer 506 may generate a corresponding segmented image 518'. The segmented image 518' outputted by the image segmentation model 504 may include one or more areas 524A-C (hereinafter generally referred to as areas 524). At least one area 524 of the segmented image 518' may include a portion of the sample image 518 determined to correspond one of the regions of interest 520. In some embodiments, the area 524 may correspond to one of the conditions for the regions of interest 520. For example, as depicted, the first area 524A may approximately coincide with the first region of interest 520A of the first condition. Furthermore, the second area 524B may approximately coincide with the second region of interest 520B of the second condition. At least one area 524 of the segmented image 518' may include a portion of the sample image 518 determined to not correspond to any of the regions of interest 520. For example, as depicted, the third area 524C may approximately coincide with neither the first region of interest 520A nor the second region of interest 520B within the sample image 518. In some embodiments, the model trainer 506 may store and maintain the segmented image 518' outputted from the image segmentation model 504. The segmented image 518' may be stored as associated with the corresponding sample image 518.

With the generation, the model trainer 506 may compare the segmented image 518' with the one or more annotations 522 for the sample image 518. In some embodiments, the model trainer 506 may perform a pixel-by-pixel comparison between the areas 524 indicated in the segmented image 518' and the corresponding annotations 522 for the sample image 518. For example, the model trainer 506 may count a number of pixels in the areas 524 that were correctly determined as corresponding to one of the regions of interest 520 indicated by the respective annotation 522. The model trainer 506 may also count a number of pixels in the areas 524 that were incorrectly determined as corresponding to one of the regions of interest 520 indicated by the respective annotation 522. In some embodiments, the model trainer 506 may compare the areas 524 for the segmented image 518' with the annotations 522 for the sample image 518 for each type of condition.

By comparing the segmented image 518' with the annotations 522 for the sample image 518, the model trainer 506 may calculate or otherwise determine at least one loss metric between the segmented image 518' and the annotations 522. The loss metric may indicate at least one difference between the segmented image 518' and the annotations 522. For example, the loss metric may be a root mean squared error, a relative root mean squared error, and a weighted cross entropy, among others. In some embodiments, the model trainer 506 may determine the loss metric on a pixel-by-pixel basis using the pixel-by-pixel comparison between the areas 524 of the segmented image 518' and the annotations 522 of the sample image 518. In some embodiments, the model trainer 506 may determine the loss metric between the areas 524 of the segmented image 518' and the annotations 522 of the sample image 518 for each type of condition.

Using the determined loss metric, the model trainer 506 may modify, set, or otherwise update at least one of the parameters in the image segmentation model 504. In some embodiments, the model trainer 506 may use the loss metric to update the set of transform layers in the image segmentation model 504. In some embodiments, the modification of the one or more parameters of the image segmentation model 504 based on the loss metric may be in accordance with an objective function for the image segmentation model 504. The objective function may define a rate at which values of the parameters of the image segmentation model 504 are updated. For example, the model trainer 506 may use an objective function (e.g., stochastic gradient descent (SGD)) with a set learning rate (e.g., ranging from $10^{-6}$ to $10^{-4}$), a momentum (e.g., ranging from 0.5 to 1), and a weigh decay (e.g., ranging from $10^{-6}$ to $10^{-4}$) for a number of iterations (e.g., ranging from 10 to 100) in training the image segmentation model 504.

The model trainer 506 may continue training the image segmentation model 504 until all of the sample images 518 of the training dataset 516 have been applied to the image segmentation model 504 to update the one or more parameters. In some embodiments, the model trainer 506 may determine whether the image segmentation model 504 has converged based on a comparison between the current determination of the loss metric and the previous determination of the loss metric. If the difference between the two loss metrics is greater than a threshold, the model trainer 506 may continue to train the image segmentation model 504. The training may continue until there are no more sample images 518 left in the training dataset 516. Otherwise, if the difference is less than or equal to the threshold, the model trainer 506 may halt training the image segmentation model 504.

Figure 5C:
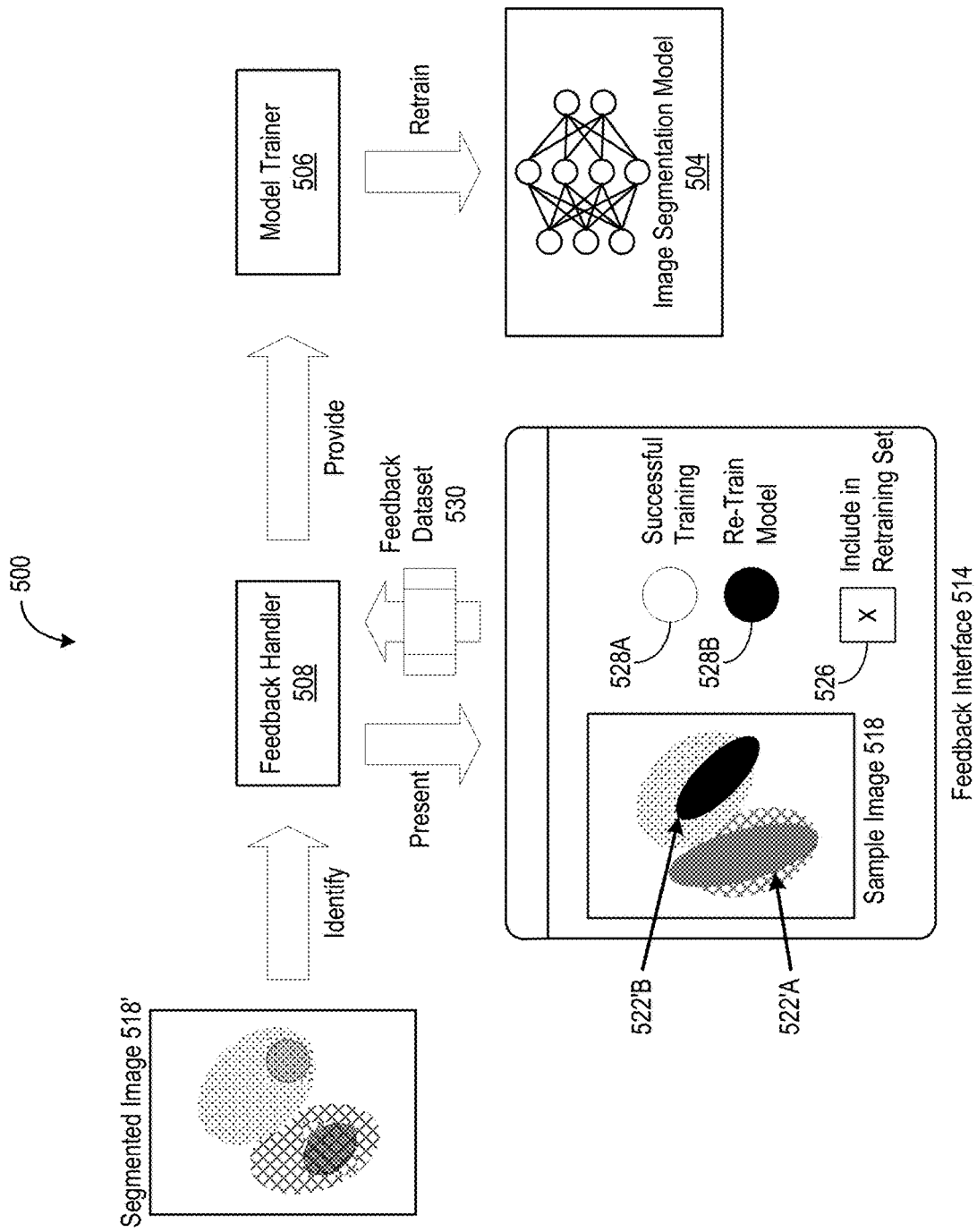
FIG. 5C depicts an activity diagram of the system for training models to segment images using feedback data, in accordance with an illustrative embodiment.

Referring now to FIG. 5C, depicted is an activity diagram of the system 500 for training image segmentation models using feedback data. As depicted, the feedback handler 508 executing on the image segmentation system 502 may identify each segmented image 518' generated by the image segmentation model 504 using the corresponding sample image 518. The feedback handler 508 may provide each segmented image 518' for presentation on the feedback interface 514 (sometimes generally referred herein as a user interface) to obtain feedback. The feedback interface 514 may be a graphical user interface (GUI) with one or more interface elements to evaluate the training of the image segmentation model 504. In some embodiments, the feedback interface 514 may be presented via a display communicatively coupled with the image segmentation system 502. In some embodiments, the feedback handler 508 may transmit, send, or provide each segmented image 518' to a computing device for presentation of the feedback interface 514. For example, the feedback interface 514 may be a graphical user interface of an application running on a computing device separate from the image segmentation system 502. In some embodiments, the feedback handler 508 may provide the feedback interface 514 itself for the presentation of each segmented image 518'. For example, the feedback handler 508 may send a script to the computing device to run and present the feedback interface 514.

The feedback interface 514 may present, render, or otherwise include one or more user interface elements to identify or generate at least one feedback dataset 530. At least one of the interface elements of the feedback interface 514 may be used to label, indicate, or otherwise mark one or more new annotations 522'A and 522'B (hereinafter generally referred to as new annotations 522') for at least a subset of the sample images 518. The element may display, render, or include the original sample image 518 (e.g., as depicted) used to generate the corresponding segmented image 518' and the corresponding segmented image 518' itself. The new annotations 522' may mark one or more corresponding areas within the sample image 518 as corresponding to one of the regions of interest 520. For example, the user (e.g., a pathologist) of the feedback interface 514 may mark by using a paintbrush tool to select a portion or an area within the image as part of the new annotations 522'. The new annotations 522' may differ from the original annotations 522 in the training dataset 516.

The new annotations 522' may be similar to the annotations 522 in the training dataset 516 for the original sample image 518. The new annotations 522' may be created by the user of the feedback interface 514, and may fully label or partially label (e.g., as depicted) the corresponding region of interest 520 in each sample image 518 or corresponding segmented image 518'. The new annotations 522' may indicate, specify, or define an area, dimensions, or coordinates of the regions of interest 520 within the sample image 518 (or the corresponding segmented image 518'). In addition, new annotations 522' may be associated with one condition corresponding to the region of interest 520. For example as depicted, the first new annotation 522'A may be associated with a first condition corresponding to the first region of interest 520A. Furthermore, the second new annotation 522'B may be associated with a second condition corresponding to the second region of interest 520B. The new annotations 522' may be included in the feedback dataset 530.

In addition, the one or more interface elements of the feedback interface 514 may include an indicator 526 to select whether the sample image 518 is to be included in the retraining of the image segmentation model 504. The indicator 526 may be a selectable user interface element, such as a command button, a radio button, a checkbox (e.g., as depicted), and a prompt, among others. The sample image 518 may be the displayed or presented in the interface element on the feedback interface 514 (e.g., as depicted), and the selection of the indicator 526 may indicate inclusion of the sample image 518 into the feedback dataset 530. The selection of the indicator 526 may also specify the inclusion of the new annotations 522' for the sample image into the feedback dataset 530. Using the indicator 526, multiple sample images 516 may be selected for inclusion in the feedback dataset 530. At least a subset of the sample images 518 from the training dataset 516 along with the corresponding new annotations 522' may be included in the feedback dataset 530. Conversely, at least a subset of the sample images 518 from the training dataset 516 may be lacking or excluded from the feedback dataset 530. In this manner, the number of sample images 518 in the retraining of the image segmentation model 504 may be less than the number of sample images 518 used for the initial training of the image segmentation model 504.

Furthermore, the interface elements of the feedback interface 514 may include an indicator 528A or 528B (hereinafter generally referred to as an indicator 528) to select whether to retrain the image segmentation model 504 as part of the feedback dataset 530. The indicator 528 may be a selectable user interface element, such as a command button, a radio button (e.g., as depicted), a checkbox, and a prompt, among others. At least one indicator 528 (e.g., the first indicator 528A as depicted) may correspond to an indication that the training of the image segmentation model 504 is successful or that the training is satisfactory. At least one indicator 528 (e.g., the second indicator 528B as depicted) may correspond to an indication that the training of the image segmentation model 504 is unsuccessful and that the image segmentation model 504 is to be re-trained or that the training is unsatisfactory. In the depicted example, the second indicator 528B may be selected by the user to indicate that the image segmentation model 504 is to be re-trained. The selection of the indicator 528 may be included in the feedback dataset 530. Upon generation, the feedback interface 514 may send, transmit, or otherwise provide the feedback dataset 530 to the feedback handler 508.

The feedback handler 508 may retrieve, receive, or otherwise identify the feedback dataset 530 via the feedback interface 514. The feedback dataset 530 may include: the indication of whether the retrain the image segmentation model 504 (e.g., as selected using the indicators 528); one or more of the sample images 518 of the training dataset 516 (e.g., as selected using the indicator 526); and new annotations 522' for the corresponding sample images 518 (e.g., generated using the feedback interface 514), among others. Upon receipt, the feedback handler 508 may parse the feedback dataset 530 to identify the indicator on whether to retrain the image segmentation model 504. When the indicator indicates that the image segmentation model 504 is not to be retrained, the feedback handler 508 in conjunction with the model trainer 506 may refrain from retraining of the image segmentation model 504. In some embodiments, the feedback handler 508 may also maintain the parameters of the image segmentation model 504. In some embodiments, the feedback handler 508 in conjunction with the model trainer 506 may also determine to terminate retraining of the image segmentation model 504.

On the other hand, when the indicator indicates that the image segmentation model 504 is to be retrained, the feedback handler 508 in conjunction with the model trainer 506 may determine that the image segmentation model 504 is to be retrained. The feedback handler 508 may also identify the one or more sample images 518 and the new annotations 522' from the feedback dataset 530. Each sample image 518 may include one or more regions of interest 520. The new annotations 522' may at least partially correspond to the regions of interest 520. Furthermore, the feedback handler 508 may provide the one or more sample images 518 and the new annotations 522' from the feedback dataset 530 to the model trainer 506 to retrain the image segmentation model 504. The model trainer 506 may repeat the functionality described above in conjunction with FIG. 5B using the feedback dataset 530. For example, the model trainer 506 may apply the image segmentation model 504 to the subset of sample images 518 from the feedback dataset 530 to generate a corresponding segmented image 518'. For each sample image 518, the model trainer 506 may calculate or determine a loss metric between the areas 524 of the corresponding segmented image 518' versus the new annotations 522'. The model trainer 506 may use the loss metrics to update at least one of the parameters of the image segmentation model 504.

The image segmentation model 504 may be retrained multiple times using the feedback dataset 530 received via the feedback interface 514 using at least some of the same sample images 518. As a result, the initial size of the training dataset 516 (and the number of sample images 518) may be smaller than training data used in model that are not trained multiple times. Because less sample images 518 are used, the image segmentation model 504 may be trained over a shorter time period than using a larger training dataset to train. In addition, with less sample images 518, the number of annotations 522 may be lessened and the time spent in preparing the annotations 522 may be reduced.

Figure 5D:
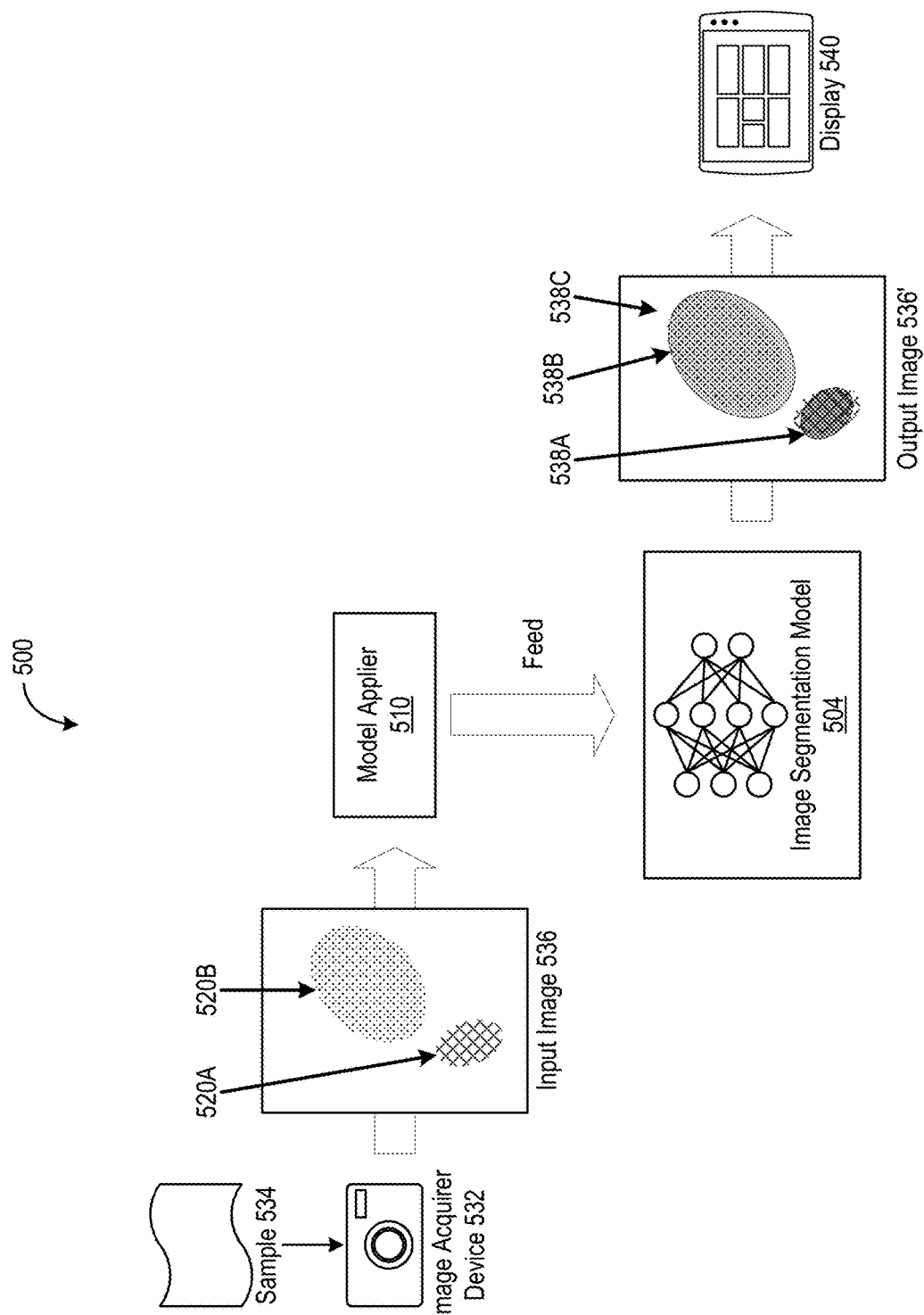
FIG. 5D depicts an activity diagram of the system for segmenting images using a trained image segmentation model, in accordance with an illustrative embodiment.

Referring now to FIG. 5D, depicted is an activity diagram for the system 500 of training models to segment images. As depicted, the system 500 may also include at least one image acquirer 532 and at least one display 540. The image acquirer 532 may acquire or generate at least one input image 536 of at least one sample 534. The sample 534 may include any object or item, the input image 536 of which is acquired via the image acquirer 532 (e.g., a camera). The sample 534 may be, for example, a histological section with a hematoxylin and eosin (H&E) stain, hemosiderin stain, a Sudan stain, a Schiff stain, a Congo red stain, a Gram stain, a Ziehl-Neelsen stain, a Auramine-rhodamine stain, a trichrome stain, a Silver stain, and Wright's Stain, among others. The sample 536 may be from a tissue section from a subject (e.g., human, animal, or plant) for performing histopathological surveys. The tissue sample may be from any part of the subject, such as a muscle tissue, a connective tissue, an epithelial tissue, or a nervous tissue in the case of a human or animal subject, among others. The image acquirer 532 may acquire the input image 536 of the sample 534 in accordance with microscopy techniques, such as using an optical microscope, a confocal microscope, a fluorescence microscope, a phosphorescence microscope, an electron microscope, among others. With the acquisition of the input image 536, the image acquirer 532 may provide, send, or transmit the input image 536 to the image segmentation system 502. The input image 536 may be similar to the sample image 518, and may include one or more regions of interest 520 within the input image 536. In some embodiments, the image acquirer 532 may acquire multiple input images 536 as a set to provide to the image segmentation system 502.

The model applier 510 executing on the image segmentation system 502 may receive, retrieve, or otherwise identify the input image 536 of the sample 534 acquired via the image acquirer 532. The model applier 510 may be executed when the image segmentation system 502 is operating under the runtime mode. With the identification, the model applier 510 may apply the image segmentation model 504 to the input image 536 to generate at least one output image 536'. To apply, the model applier 510 may feed the input image 536 into the image segmentation model 504. The model applier 510 may process the input image 536 in accordance with the parameters (and transform layers) of the image segmentation model 504 (e.g., using the model 600 detailed herein in FIG. 6A). By processing the input image 536 using the image segmentation model 504, the model applier 510 may generate the output image 536'.

The output image 536' may be a segmentation of the input image 536, similar to the segmented image 518' generated using the sample image 518. The output image 536' may include one or more areas 538A-C (hereinafter generally referred to as areas 538). At least one area 538 of the output image 536' may include a portion of the input image 536 determined to correspond one of the regions of interest 520. In some embodiments, the area 538 may correspond to one of the conditions for the regions of interest 520. For example, as depicted, the first area 538A may approximately coincide with the first region of interest 520A of the first condition. Furthermore, the second area 538B may approximately coincide with the second region of interest 520B of the second condition. At least one area 538 of the output image 536' may include a portion of the input image 536 determined to not correspond to any of the regions of interest 520. For example, as depicted, the third area 538C may approximately coincide with neither the first region of interest 520A nor the second region of interest 520B within the output image 536'.

The model applier 510 may perform evaluation procedures on the output image 536' generated by applying the image segmentation model 504 on the input image 536. In some embodiments, the model applier 510 may generate a set of image tiles from the output image 536' by partitioning or dividing the output image 536'. Each image tile from the output image 536' may correspond to a portion or an area of the output image 536'. The portion forming the corresponding image tile may be mutually exclusive or at least partially overlapping. From the set of image tiles, the model applier 510 may identify a subset of the image tiles corresponding to the one or more areas 538 determined to be corresponding to one of the regions of interest 520. For example, the model applier 510 may select the subset of image tiles corresponding to the first area 538A associated with the first condition for the first region of interest 520A.

In some embodiments, the model applier 510 may calculate, determine, or identify a number of pixels (or dimensions or an area) within each area 538 of the output image 536'. The number of pixels within each area 538 may equal or correspond to a number of pixels determined using the image segmentation model 504 to be part of the respective region of interest 520. The number of pixels for each area 538 may correspond to the region of interest 520 associated with the condition (or the lack of any condition). For example, the number of pixels within the first area 538A may correspond to the number of pixels determined by the image segmentation model 504 to be part of the first region of interest 520A of the first condition. In some embodiments, the model applier 510 may identify the number of pixels outside the area 538 within the output image 536' that correspond to the lack of the condition associated with the respective region of interest 520. For example, the model applier 510 may determine the number of pixels outside the first area 538A within the output image 536' corresponding to the lack of the first condition associated with the first region of interest 520A. The number of pixels outside the first area 538A may correspond to the number of pixels of the second area 538B determined to correspond to the second condition associated with the second region of interest 532B and the third area 538C determined to correspond to neither the first condition nor the second condition.

With the identification, the model applier 510 may compare the number of pixels within the area 538 of the output image 536' to a threshold value (e.g., number of pixels, dimensions, or area) for the condition associated with the area 538. The threshold value may correspond to the number of pixels (or dimensions or area) at which the sample 534 from which the input image 536 is obtained, the input image 536, or the output image 536' derived from the input image 536 has the condition associated with the area 538. For example, the sample 534 may be a tissue sample, and when the number of pixels for the first area 538 associated with a lesion condition is determined to be greater than threshold value (e.g., $10^6$ pixels), the tissue sample may be determined to have the lesion condition. When the number of pixels within the area 538 is determined to satisfy the threshold value (e.g., greater than or equal to), the model applier 510 may classify or determine the sample 534, the input image 536, or the output image 536' as having the condition. Otherwise, when the number of pixels within the area 538 is determined to not satisfy the threshold value (e.g., less than), the model applier 510 may classify or determine the sample 534, the input image 536, or the output image 536' as not having the condition.

With the generation of the output image 536', the model applier 510 may send, transmit, or otherwise provide the output image 536' to the display 540 for presentation thereon. The display 540 may be part of the image segmentation system 502 or another computing device communicatively coupled with the image segmentation system 520. In some embodiments, the model applier 510 may provide the set of image tiles identified from the output image 536' identified as part of one of the areas 538 (e.g., the first area 538A or the second area 538B). In some embodiments, the model applier 510 may provide the classification of whether the sample 534, the input image 536, or the output image 536' as having or not having the condition. Upon receipt of the output image 536', the display 540 may render, display, or otherwise present the output image 536'. In some embodiments, the display 540 may present the set of image tiles identified from the output image 536'. In some embodiments, the display 540 may present the classification of whether the sample 534, the input image 536, or the output image 536' as having or not having the condition.

Figure 6A:
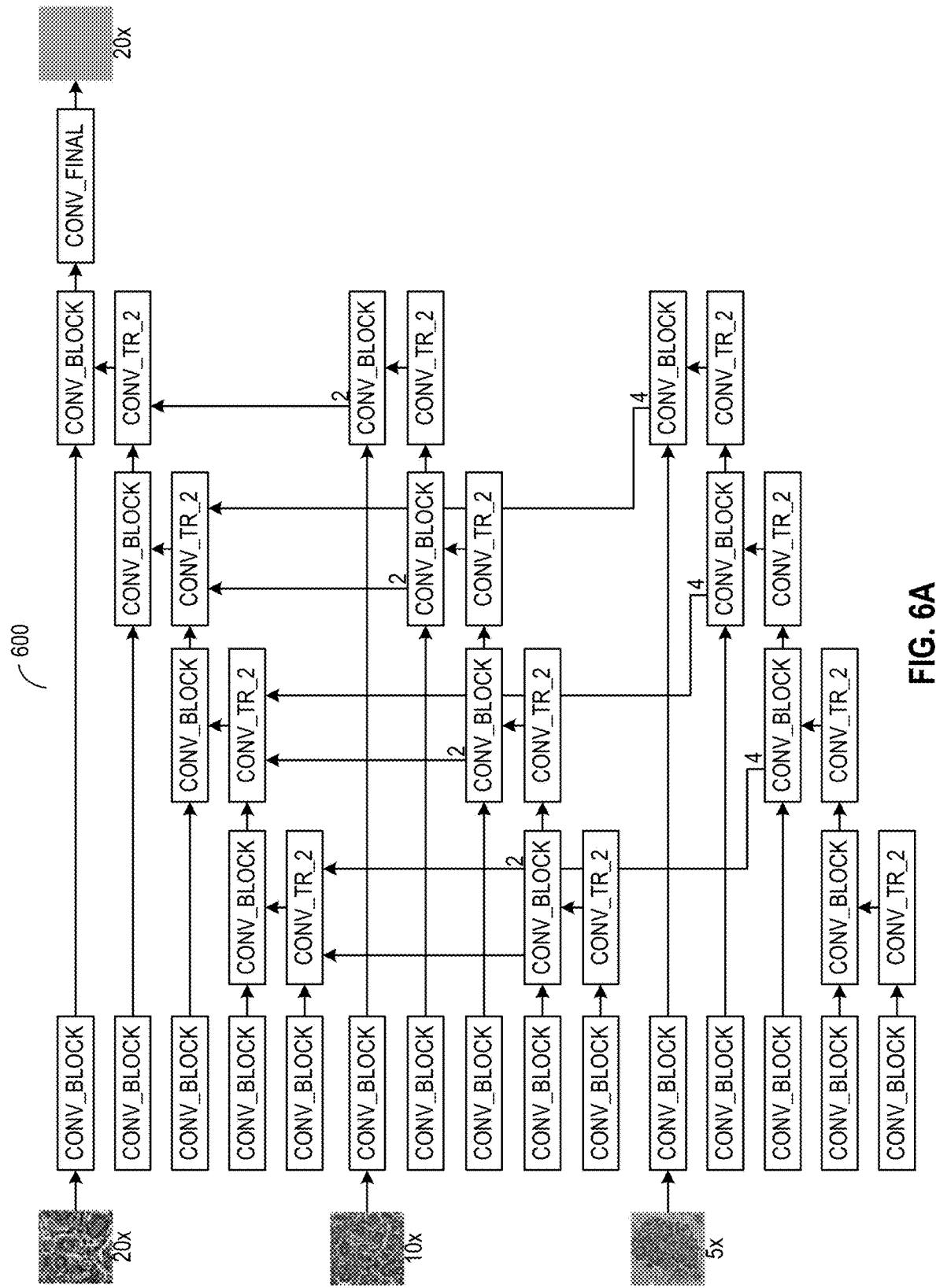
FIG. 6A depicts a block diagram of a Multi-Encoder Multi-Decoder Multi-Concatenation (MEMDMC) architecture, in accordance with an illustrative embodiment.

Referring now to FIG. 6A, depicted is a block diagram of a Multi-Encoder Multi-Decoder Multi-Concatenation (MEMDMC) architecture 600 utilizing multiple patches in various magnifications and feature maps are concatenated during intermediate layers to enrich feature maps for the 20× decoder. The multiple encoders and decoders in the architecture 600 and has concatenations between multiple layers in the decoders to enrich feature maps for the 20× decoder. The architecture 600 may be used to implement the image segmentation model 504 of the image segmentation system 502. Other networks, architectures, or algorithms may be used to implement the image segmentation model 504.

Figure 6B:
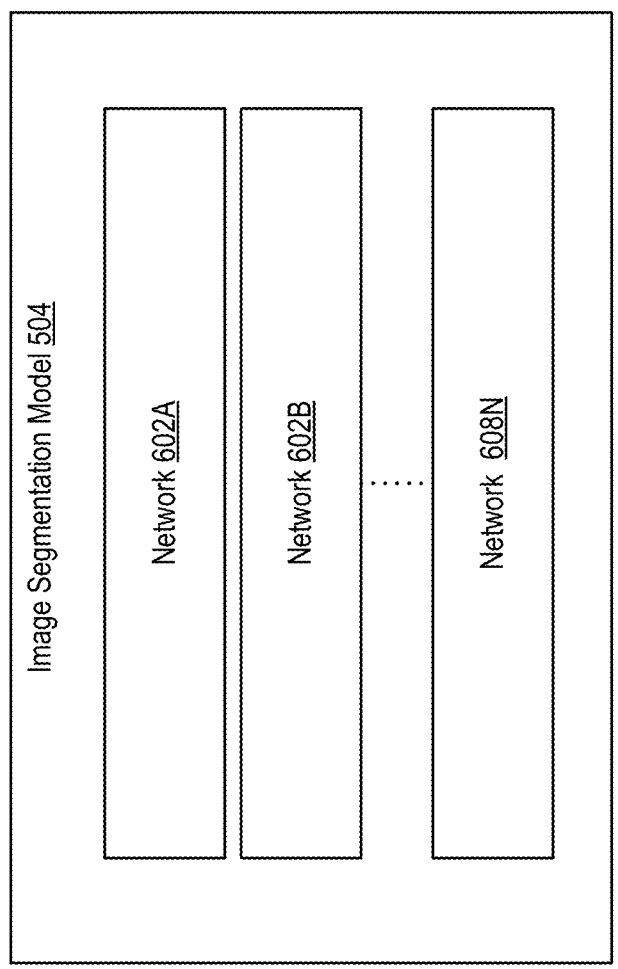
FIG. 6B depicts a block diagram of an image segmentation model in accordance with an illustrative embodiment.

Referring now to FIG. 6B, depicted is a block diagram of the image segmentation model 504. The image segmentation model 504 may have a set of networks 602A-N (hereinafter generally referred to as networks 602). In applying the image segmentation model 504, the model applier 510 may each patch into corresponding network 602 of the image segmentation model 504 for the magnification factor attributed to the patch. For example, the model applier 510 may feed: the first patch at the first magnification factor to the first network 602A, the second patch at the second magnification factor to the second network 602B, and the third patch at the third magnification factor to the third network 602C, and so forth. By applying each tile, the model applier 510 may generate a corresponding tile for the segmented image. Details of the functions and structures of the image segmentation model 504 and the networks 602 are provided herein in conjunction with FIGS. 6C-G below. Other networks, architectures, or algorithms may be used to implement the image segmentation model 504.

Figure 6C:
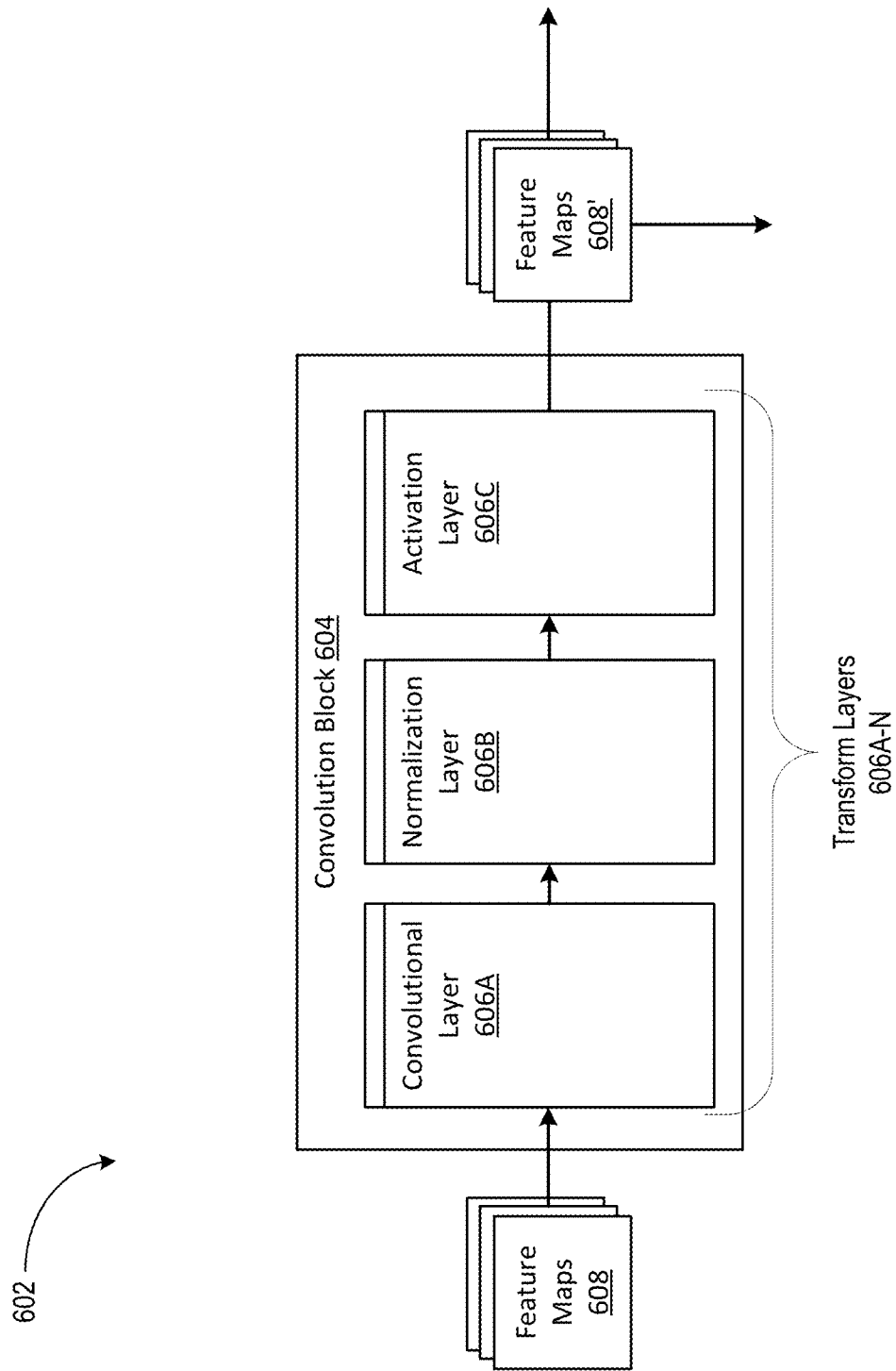
FIG. 6C depicts a block diagram of a convolution block of a network in a segmentation model for segmenting images in accordance with an illustrative embodiment.

Referring now to FIG. 6C, depicted is a block diagram of a convolution block 604 (sometimes referred herein as an encoder) in one of the networks 602 of the image segmentation model 504 in accordance with an illustrative embodiment. One or more instances of the convolution block 604 can be included in each network 602 of the image segmentation model 504. In overview, the convolution block 604 may include a set of transform layers 606A-N. The set of transform layers 606A-N may include one or more convolutional layers 606A and one or more normalization layers 606B, and one or more activation layers 606C (also referred herein as a rectified linear unit), among others. In some embodiments, the set of transform layers 606A-N may lack the one or more normalization layers 606B. The convolution block 604 may have a set of feature maps 608 (as shown) or one of the patches as input. The set of transform layers 606A-N of the convolution block 604 may be applied to the input, such as the set of feature maps 608 or one of the patches, in any sequence (such as the one depicted). The set of input feature maps 608 may have the same resolution of the patch inputted to the network 602 in which the convolution block 604 is in. The resolution may correspond or define a number of pixels in each dimension of the feature map 608 or the patch. The set of input feature maps 608 may be the resultant output of another component of the same or different network 602 from processing one of the patches.

The convolution layer 606A of the convolution block 604 may include one or more filters (sometimes referred to as kernels or feature detectors). The convolution layer 606A may apply the one or more filters to the input set of feature maps 608. Each filter may be a function to apply to the input of the convolutional layer 606A over the predetermined size at a predetermined stride (e.g., ranging from 1 to 54) to generate an output. The function of the filter may include one or more parameters (sometimes referred to as weights) to apply to the input. The one or more parameters may be set, adjusted, or modified by training. Each filter may be of a predetermined size (e.g., ranging from 3×3×1 to 1024× 1024×3). The size and the number of the filter may differ depending on which network 602 the instance of the convolution layer 606A is included in. The parameter of the convolutional layer 606A may be repeatedly applied to the input (e.g., the input set of feature maps 608) in accordance with the predetermined stride to generate an output.

The normalization layer 606B of the convolution block 604 may include at least one function to apply to the output of the previous transform layer 606A-N (e.g., the convolution layer 606A as depicted). The function of the normalization layer 606B may include one or more parameters to apply to the input. The function may be set, adjusted, or modified by training. The normalization layer 606B may identify a range of values of the input. From the range of values, the normalization layer 606B may identify a minimum value, a maximum value, and a difference between the minimum value and the maximum value for the input. The normalization layer 606B may determine a transformation factor based on the minimum value, the maximum value, and the difference between the minimum value and the maximum value (e.g., as a linear function). The normalization layer 606B may then apply (e.g., multiply) the transformation factor to all the input to form the output.

The activation layer 606C of the convolution block 604 may include at least one function to apply to the output of the previous transform layer 606A-N (e.g., the convolution layer 606A or the normalization layer 606B as depicted). The function of the activation layer 606C may be an activation function, such as an identity function, a unit step function, a hyperbolic function, an arcus function, or a rectifier function (max(0, x)), among others. The function may be set, adjusted, or modified by training. The activation function may be non-linear. The activation layer 606C may traverse all of the input each corresponding to the output of one of the filters at the previous transform layer 606A-N, such as the convolutional layer 606A as depicted. While traversing, the activation layer 606C may apply the activation function to the input to generate the output set of feature maps 608'. Because of the activation function, the output of the activation layer 606C may be non-linear relative to the input.

By applying the set of transform layers 606A-N to the set of feature maps 608 or one of the patches, the convolution block 604 may generate a set of feature maps 608' as output. With the generation, the convolution block 604 may feed or provide the output set of feature maps 608' along the same network 602 of the image segmentation model 504 (e.g., as depicted by the horizontal arrow). The convolution block 604 may feed or provide the output set of feature maps 608' to a network 602 for a different magnification factor in the image segmentation model 504 (e.g., as depicted by the downward vertical arrow). The output set of feature maps 608' may have the same resolution as the input set of feature maps 608 and the patch inputted into the network 602 in which the convolution block 604 is in.

Figure 6D:
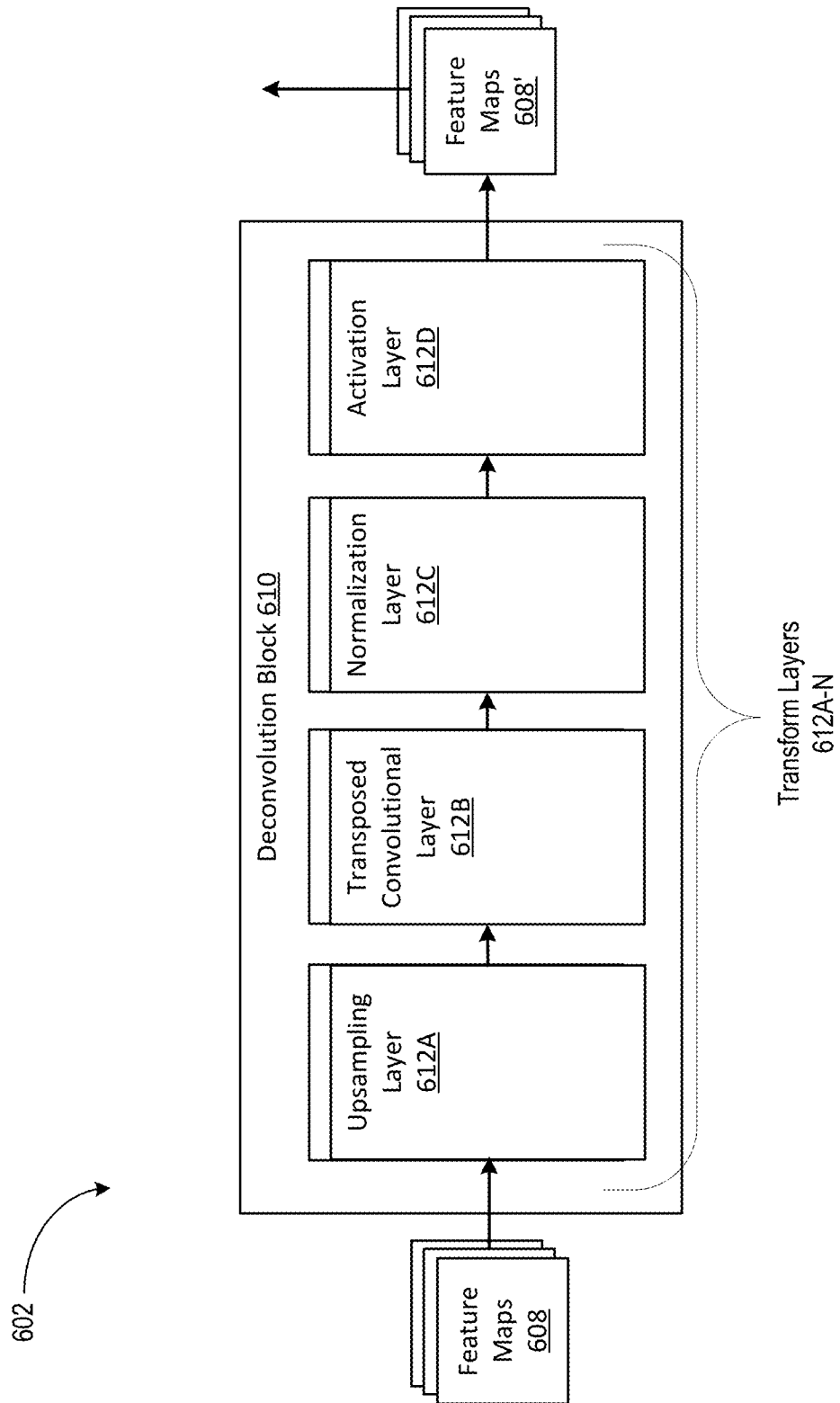
FIG. 6D depicts a block diagram of a deconvolution block of a network in a segmentation model for segmenting images in accordance with an illustrative embodiment.

Referring to FIG. 6D, depicted is a block diagram of a deconvolution block 610 (sometimes referred herein as a decoder) in one of the networks 602 of the image segmentation model 504 in accordance with an illustrative embodiment. One or more instances of the deconvolution block 610 can be included in each network 602 of the image segmentation model 504. In overview, the deconvolution block 610 may include a set of transform layers 612A-N. The set of transform layers 612A-N may include one or more upsampling layers 612A, one or more convolutional layers 612B, one or more normalization layers 612C, and one or more activation layers 612D (also referred herein as a rectified linear unit), among others. In some embodiments, the set of transform layers 612A-N may lack the one or more normalization layers 612B. The deconvolution block 610 may have a set of feature maps 608 as input. The set of transform layers 612A-N of the deconvolution block 610 may be applied to the input, such as the set of feature maps 608, in any sequence (such as the one depicted). The set of input feature maps 608 may have the same resolution or size of the patch inputted to the network 602 in which the deconvolution block 610 is in. The set of input feature maps 608 may be the resultant output of another component of the same or different network 602 from processing one of the patches inputted to the network 602.

The upsampling layer 612A of the deconvolution block 610 may increase a resolution of the input set of feature maps 608 to a target resolution. The target resolution may equal the resolution of another network 602 within the image segmentation model 504 to which the resultant output set of feature maps 608' is to be fed into. In some embodiments, the upsampling layer 612A may identify the resolution of the input set of feature maps 608. With the identification, the upsampling layer 612A may determine a difference between the resolution and the target resolution. With the determination of the difference, the upsampling layer 612A may perform zero-padding to the input set of feature maps 608 to increase the resolution by the difference to the target resolution. The upsampling layer 612A may apply an interpolation filter to the zero-padded input set of feature maps 608 to smooth discontinuities arising from zero-padding. The interpolation filter may be of the same size as the target resolution.

The transposed convolutional layer 612B of the deconvolution block 610 may include one or more filters (sometimes referred to as kernels or feature detectors). The convolution layer 612B may apply the one or more filters to the input set of feature maps 608. Each filter may be a function to apply to the input of the transposed convolutional layer 612B over the predetermined size at a predetermined stride (e.g., ranging from 1 to 54) to generate an output. The function of the filter may include one or more parameters (sometimes referred to as weights) to apply to the input. Relative to the parameters in the convolutional layer 606A in the convolution block 604, the parameters of the filters in the transposed convolutional layer 612B of the deconvolution block 610 may be transposed or inversed (pseudo-inverse). The one or more parameters of the filters may be set, adjusted, or modified by training. The adjusting of the parameters of the filters in the transposed convolutional layer 612B of the deconvolution block 610 may depend on the adjusting of the parameters of the filters in the convolutional layer 606A in the convolution block 604. Each filter may be of a predetermined size (e.g., ranging from 3×3×1 to 1024×1024×3). The size and the number of the filter may differ depending on which network 602 the instance of the convolution layer 612B is included in. The parameter of the convolutional layer 612B may be repeatedly applied to the input (e.g., the input set of feature maps 608) in accordance with the predetermined stride to generate an output.

The normalization layer 612C of the deconvolution block 610 may include at least one function to apply to the output of the previous transform layer 612A-N (e.g., the transposed convolution layer 612B as depicted). The function of the normalization layer 612C may include one or more parameters to apply to the input. The function may be set, adjusted, or modified by training. The normalization layer 612C may identify a range of values of the input. From the range of values, the normalization layer 612C may identify a minimum value, a maximum value, and a difference between the minimum value and the maximum value for the input. The normalization layer 612C may determine a transformation factor based on the minimum value, the maximum value, and the difference between the minimum value and the maximum value (e.g., as a linear function). The normalization layer 612C may then apply (e.g., multiply) the transformation factor to all the input to form the output.

The activation layer 612D of the deconvolution block 610 may include at least one function to apply to the output of the previous transform layer 612A-N (e.g., the transposed convolution layer 612B or the normalization layer 612C as depicted). The function of the activation layer 612D may be an activation function, such as an identity function, a unit step function, a hyperbolic function, an arcus function, or a rectifier function (max(0, x)), among others. The function may be set, adjusted, or modified by training. The activation function may be non-linear. The activation layer 612D may traverse all of the input each corresponding to the output of one of the filters at the previous transform layer 612A-N, such as the convolutional layer 612B. While traversing, the activation layer 612D may apply the activation function to the input to generate the output set of feature maps 608'. Because of the activation function, the output of the activation layer 616B may be non-linear relative to the input.

By applying the set of transform layers 612A-N to the set of input feature maps 608, the deconvolution block 610 may generate a set of feature maps 608' as the output. With the generation, the deconvolution block 610 may feed or provide the output set of feature maps 608' to a network 602 for a different magnification factor in the image segmentation model 504 (e.g., as depicted by the upward vertical arrow). The output set of feature maps 608' may have the same resolution as the input set of feature maps 608 of the network 602 to which the deconvolution block 610 feeds the output set of feature maps 608'.

Figure 6E:
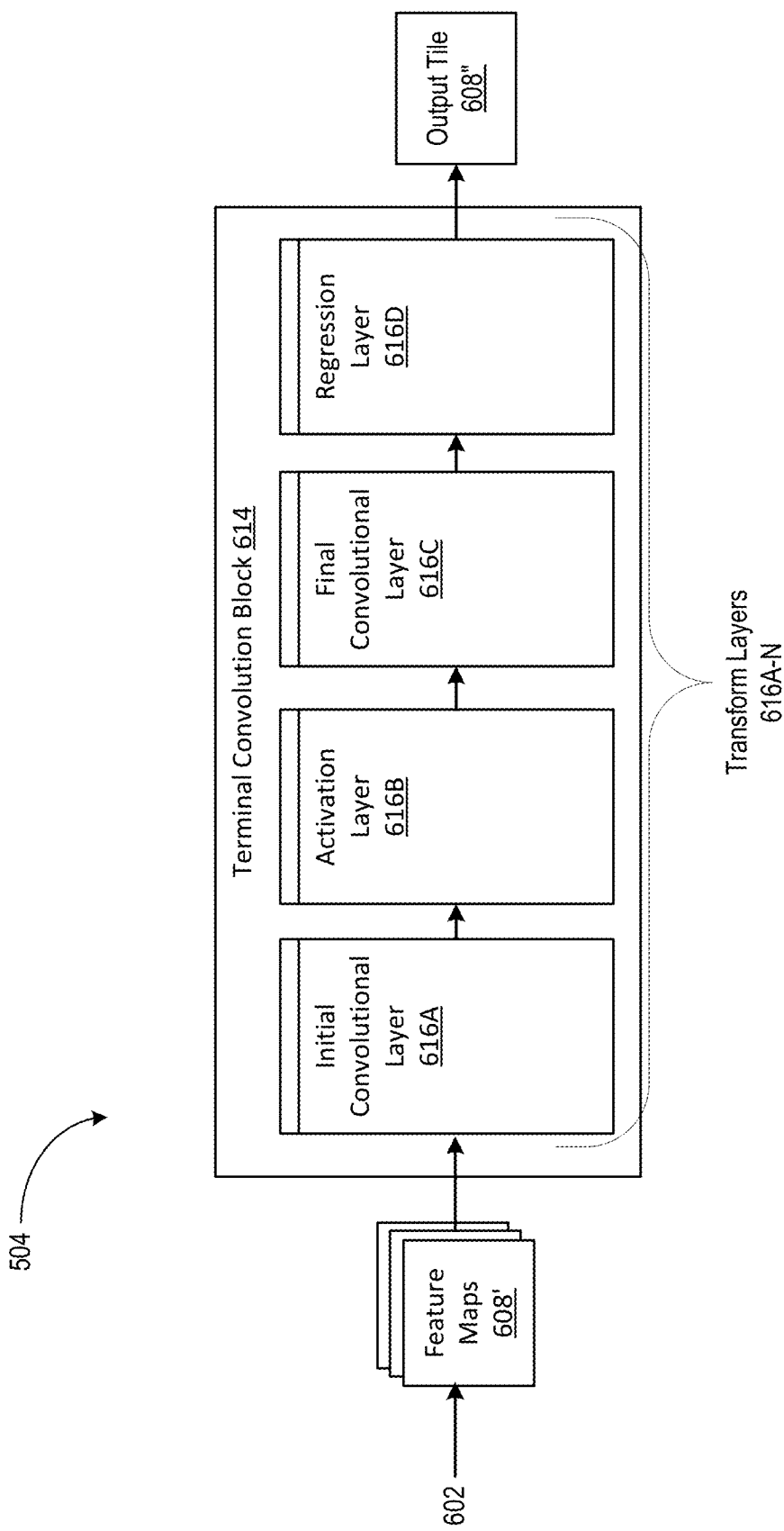
FIG. 6E depicts a block diagram of a terminal convolution block of a network in a segmentation model in accordance with an illustrative embodiment.

Referring to FIG. 6E, depicted is a block diagram of a terminal convolution block 614 in the image segmentation model 504 in accordance with an illustrative embodiment. One or more instances of the terminal convolution block 614 can be included in the image segmentation model 504. In overview, the terminal convolution block 614 may include a set of transform layers 616A-N. The set of transform layers 616A-N may include one or more initial convolutional layers 616A, one or more activation layers 616B, one or more final convolution layers 616C, and one or more regression layers 616D, among others. The terminal convolution block 614 may have a set of feature maps 608 as input. The set of transform layers 616A-N of the terminal convolution block 614 may be applied to the input, such as the set of feature maps 608', in any sequence (such as the one depicted), outputted by one of the networks 602. The set of feature maps 608' may be the resultant output of one of the networks 602 from processing one of the patches and other input feature maps 608 inputted to the network 602.

The initial convolutional layer 616A of the terminal convolution block 614 may include one or more filters (sometimes referred to as kernels or feature detectors). The convolution layer 616A may apply the one or more filters to the set of feature maps 608' inputted into the terminal convolution block 614. Each filter may be a function to apply to the input of the convolutional layer 616A over the predetermined size at a predetermined stride (e.g., ranging from 1 to 54) to generate an output. The function of the filter may include one or more parameters (sometimes referred to as weights) to apply to the input. The one or more parameters may be set, adjusted, or modified by training. Each filter may be of a predetermined size (e.g., ranging from 3×3×1 to 1024×1024×3). The size and the number of the filter may differ depending on the network 602 providing the set of feature maps 608' as input into the terminal convolution block 614. The parameter of the convolutional layer 616A may be repeatedly applied to the input (e.g., the set of feature maps 608') in accordance with the predetermined stride to generate an output.

The activation layer 616B of the terminal convolution block 614 may include at least one function to apply to the output of the previous transform layer 616A-N (e.g., the initial convolution layer 616A). The function of the activation layer 616B may be an activation function, such as an identity function, a unit step function, a hyperbolic function, or an arcus function, a rectifier function (max(0, x)), among others. The function may be set, adjusted, or modified by training. The activation function may be non-linear. The activation layer 616B may traverse all of the input each corresponding to the output of one of the filters at the previous transform layer 616A-N, such as the initial convolutional layer 616A. While traversing, the activation layer 616B may apply the activation function to the input to generate the output set of feature maps. Because of the activation function, the output of the activation layer 616B may be non-linear relative to the input.

The final convolutional layer 616C of the terminal convolution block 614 may include one or more filters (sometimes referred to as kernels or feature detectors). The convolution layer 616C may apply the one or more filters to the output of the activation layer 616B. Each filter may be a function to apply to the input of the convolutional layer 616C over the predetermined size at a predetermined stride (e.g., ranging from 1 to 54) to generate an output. The function of the filter may include one or more parameters (sometimes referred to as weights) to apply to the input. The one or more parameters may be set, adjusted, or modified by training. Each filter may be of a predetermined size (e.g., ranging from 3×3×1 to 1024×1024×3). The size and the number of the filter may differ depending on the network 602 providing the set of feature maps 608' as input into the terminal convolution block 614. The parameter of the convolutional layer 616C may be repeatedly applied to the input (e.g., the set of feature maps 608') in accordance with the predetermined stride to generate an output.

The regression layer 616D of the terminal convolution block 614 may include at least one function to apply to the output of the previous transform layer 616A-N (e.g., the final convolution layer 616C). The function of the regression layer 616D may be a logistic activation function, such as a softmax function (sometimes referred herein as a normalized exponential function or a multinomial logistic regression), among others. The function may be set, adjusted, or modified by training. The activation function may be non-linear. The regression layer 616D may traverse all of the input each corresponding to the output of one of the filters at the previous transform layer 616A-N, such as the final convolutional layer 616C. While traversing, the regression layer 616D may apply the activation function to the input to generate the output set of feature maps. Because of the logistic activation function, the output of the regression layer 616D may be non-linear relative to the input.

By applying the set of transform layers 616A-N to the set of feature maps 608', the terminal convolution block 614 may generate a corresponding tile (e.g., corresponding to feature maps 608") for the segmented image. The output tile may have the same resolution as the set of feature maps provided as input to the terminal convolution block 614. In turn, the output tile may also have the same resolution and magnitude factor as the original patch outputted by the network 602 providing the set of feature maps 608' as input. The generation of additional tiles may be use the segmented image corresponding to the image.

Figure 6F:
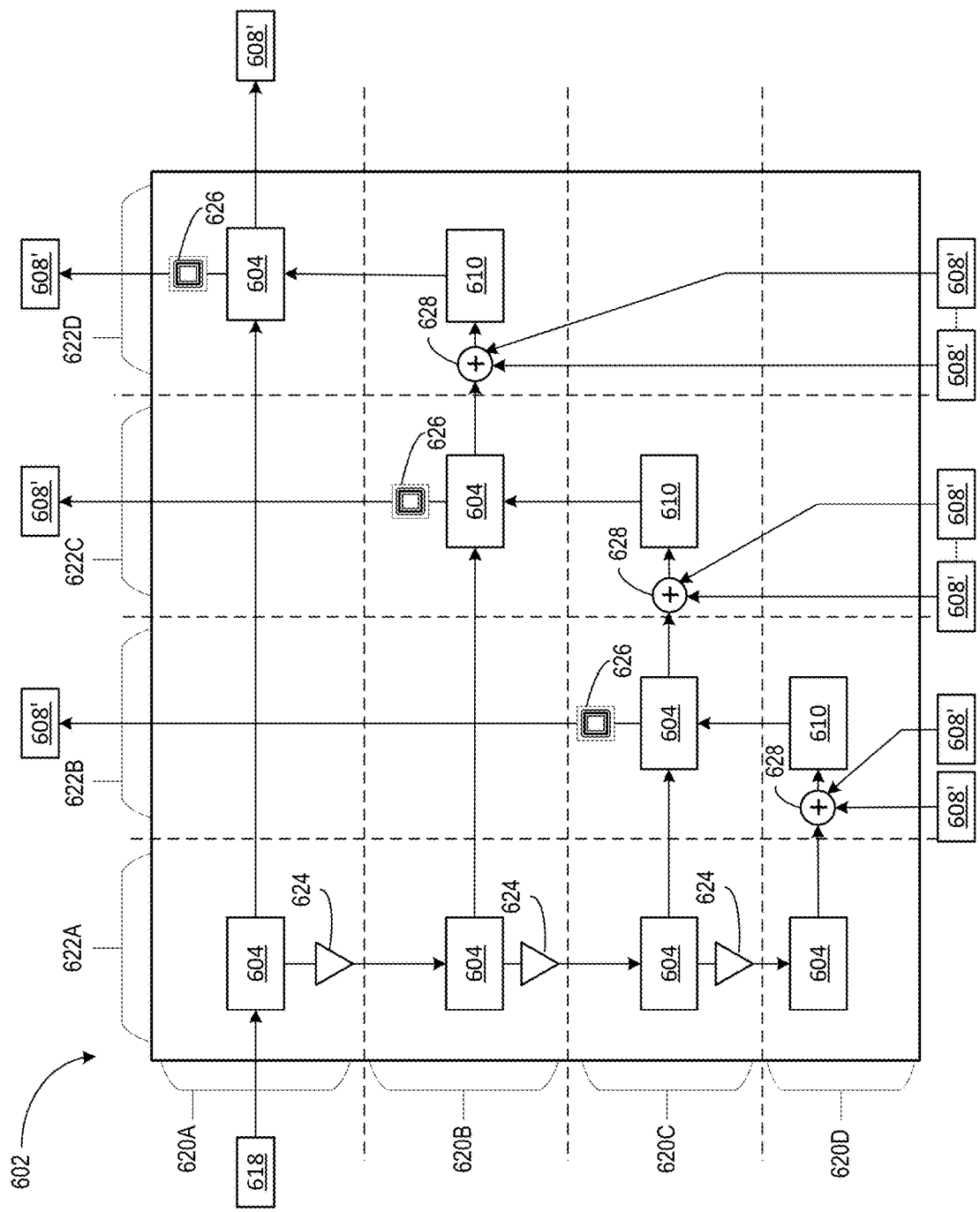
FIG. 6F depicts a block diagram of a network in the segmentation model for segmenting images in accordance with an illustrative embodiment.

Referring to FIG. 6F, depicted is a block diagram of one of the networks 602 of the image segmentation model 504 in accordance with an illustrative embodiment. Instances of the network 602 may be included in the image segmentation model 504. In addition, different instances of the network 602 may include or lack at least some of components or input/output connections depicted in the example. In overview, the network 602 and the components thereof may be divided, organized, or arranged into a set of rows 620A-N (hereinafter generally referred to as row 620) and into a set of columns 622A-N (hereinafter generally referred to as column 622). The network 602 may have one or more sets of feature maps 608' as outputs (depicted generally above). The network 602 may have one of the patches of a tile in the image (depicted generally to the left) and set of feature maps 608' outputted from other networks 602 (depicted generally below) as an input.

The network 602 may have one or more convolution blocks 604 and one or more deconvolution blocks 610 arranged across different rows 620 (sometimes referred herein as channels). Each row 620 may correspond to feeding forward of processed feature maps of the same resolution or size. The size may correspond or define a number of pixels in each dimension of the feature map. For example, the first row 620A may have two convolution blocks 604 (one depicted generally towards the left and the other depicted generally towards the right). The feature maps processed and outputted by the convolution blocks 604 in the first row 620A may be of the same resolution. Likewise, the second row 620B may feed forward feature maps of the same resolution, the third row 620C may feed forward feature maps of the same resolution, and the fourth row 620D, and so forth. Conversely, the feature maps in different rows 620 may be of different resolutions. For example, the feature maps fed forward along the second row 620B may have a different resolution from the feature maps fed forward along the first row 620A. Each row 620 may include at least one convolution block 604. At least some of the rows 620, such as the rows 620B-N below the first row 620A, may include at least one deconvolution block 610.

The network 602 may have one or more convolution blocks 604 and one or more deconvolution blocks 610 arranged across different columns 622. Each column 622 may correspond to feeding upward or downward of processed feature maps from one resolution (or one row 620) to another resolution (or another row 620) after processing by one of the convolution blocks 604 or one of the deconvolution blocks 610. For example, the first column 622A may correspond to a first instance the processed feature maps are passed from one row to another row after processing by the first convolution block 604 in each row 620. Likewise, the second column 622B may correspond to a second instance the feature maps are passed from one row to another row after processing by the convolution block 604 in the third row 620C or the deconvolution block 610 in the fourth row 620D.

In addition to the convolution blocks 604 and the deconvolution blocks 610, the network 602 may include one or more pooling units 624 (sometimes referred herein as a pooling operator). Each pooling unit 624 may span between rows 620 or may be in one of the rows 620 (e.g., as depicted) to feed into from one row 620 to another row 620. Each pooling unit 624 may retrieve, receive, or otherwise identify feature maps processed by one of the convolution blocks 604 (e.g., as depicted) or deconvolution blocks 610 in the same row 620. The pooling unit 624 may apply a pooling operation to the identified feature maps. The pooling operation can include, for example, max-pooling by a predefined factor (e.g., 2 to 10) to select the highest value within each set patch in the feature map or mean-pooling to determine an average value within the set patch in the feature map. With the application of the pooling operation, the pooling unit 624 may generate a feature map of a resolution same as the row 620 to which the feature map is to be provided. The size of the resultant set of feature maps may have a lower size than the input set of feature maps.

Furthermore, the network 602 may include one or more cropping units 626 (sometimes referred herein as crop operators or croppers). Each cropping unit 626 may retrieve, receive, or otherwise identify feature maps processed by one of the convolution blocks 604 (e.g., as depicted) or deconvolution blocks 610 in the same row 620. The cropping unit 626 may apply or perform a cropping operation at a predefined cropping rate (e.g., 2 to 10) to the identified feature maps. In performing the cropping operation, the cropping unit 626 may identify a portion of the feature map. The portion may correspond to, for example, a center portion, a left portion, a right portion, a top portion, a bottom portion, a top-left portion, a top-right portion, a bottom-left portion, a bottom-right portion, or any other subsection of the feature map. With the application of the cropping operation, the cropping unit 626 may generate feature maps 608' of a resolution same as the network 602 to which the feature maps 608' are to be provided (e.g., as depicted generally toward top). The size of the resultant set of feature maps may have a higher size than the input set of feature maps.

Additionally, the network 602 may include one or more concatenation units 628 (sometimes referred herein as concatenators or aggregators). Each concatenation unit 628 may concatenate, adjoin, or otherwise add two or more feature maps prior to processing by the subsequent deconvolution block 610 (e.g., as depicted) or the convolution block 604 within the same row 620. In some embodiments, the concatenation unit 628 may be part of the deconvolution block 610 that is to process the resultant set of feature maps in the same row 620. Each received feature map may be from another network 602 within the image segmentation model 504. Upon receipt of input feature maps, the concatenation unit 628 may combine the feature maps to generate a resultant set of feature maps to feed forward along the row 620. The combination of the feature maps (e.g., feature maps 608') by the concatenation unit 628 may include concatenation, weighted summation, and addition, among others. The resultant set of feature maps may be fed forward for input to the deconvolution block 610 (e.g., as depicted) for additional processing in the network 602.

With the arrangement of the components of the network 602 across the rows 620 and columns 622, the network 602 may have one or more inputs and outputs arranged across the rows 620 and the columns 622 as well. The first row 620A may have one of the patches from a tile 618 of the image as input and a resultant set of feature maps 608' as output. The second and subsequent columns 622B-N (e.g., the second column 622B, third column 622C, fourth column 622D) each may have resultant sets of feature maps 608' from other network 602, such as networks 602 associated with lower magnification factors, as input. In addition, the second and subsequent columns 622B-N each may have resultant sets of feature maps 608' outputted by the components therein as outputs to other networks 602, such as networks 602 associated with higher magnification factors, as output.

Figure 6G:
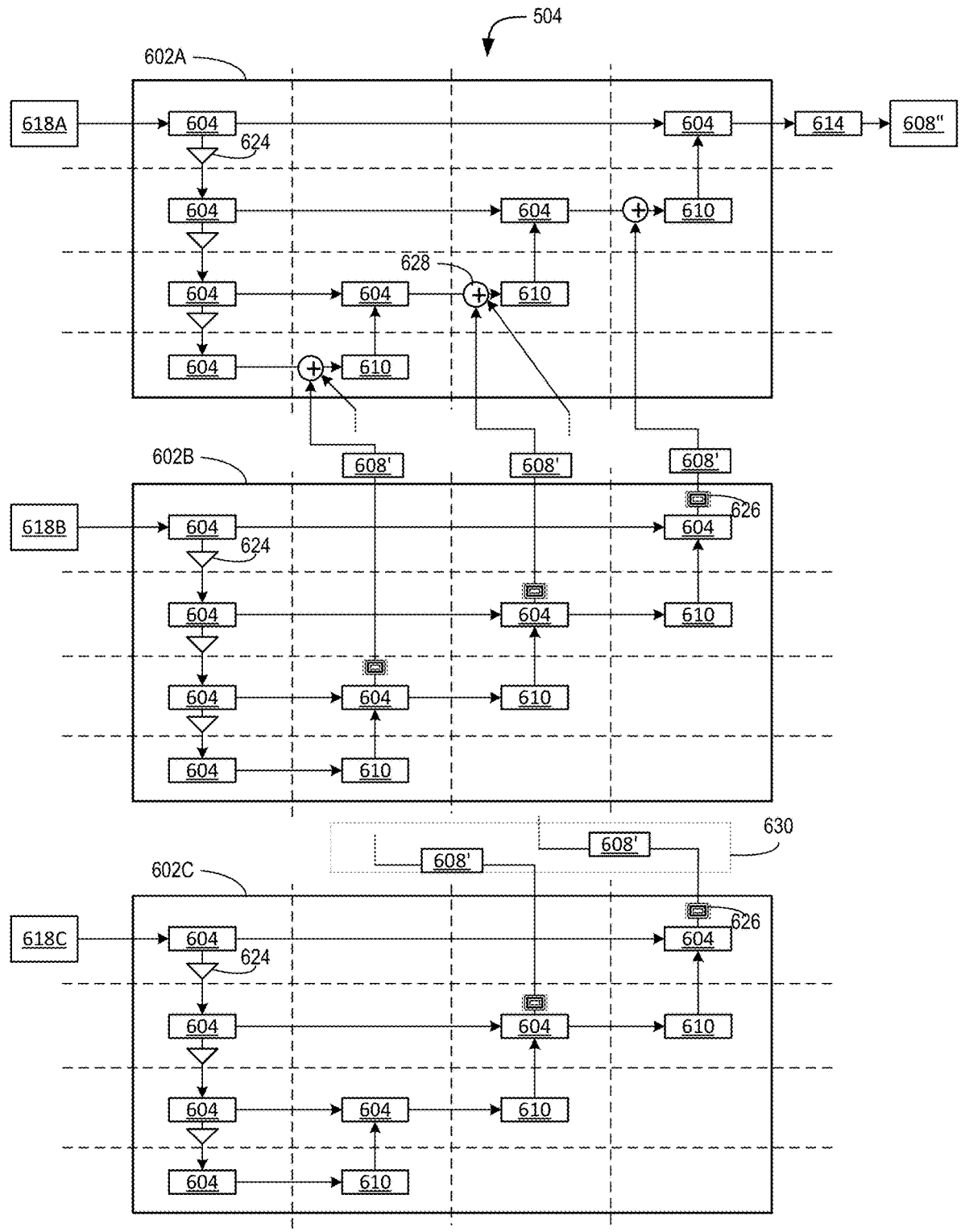
FIG. 6G depicts a block diagram of the segmentation model for segmenting images in accordance with an illustrative embodiment.
Figure 7A:
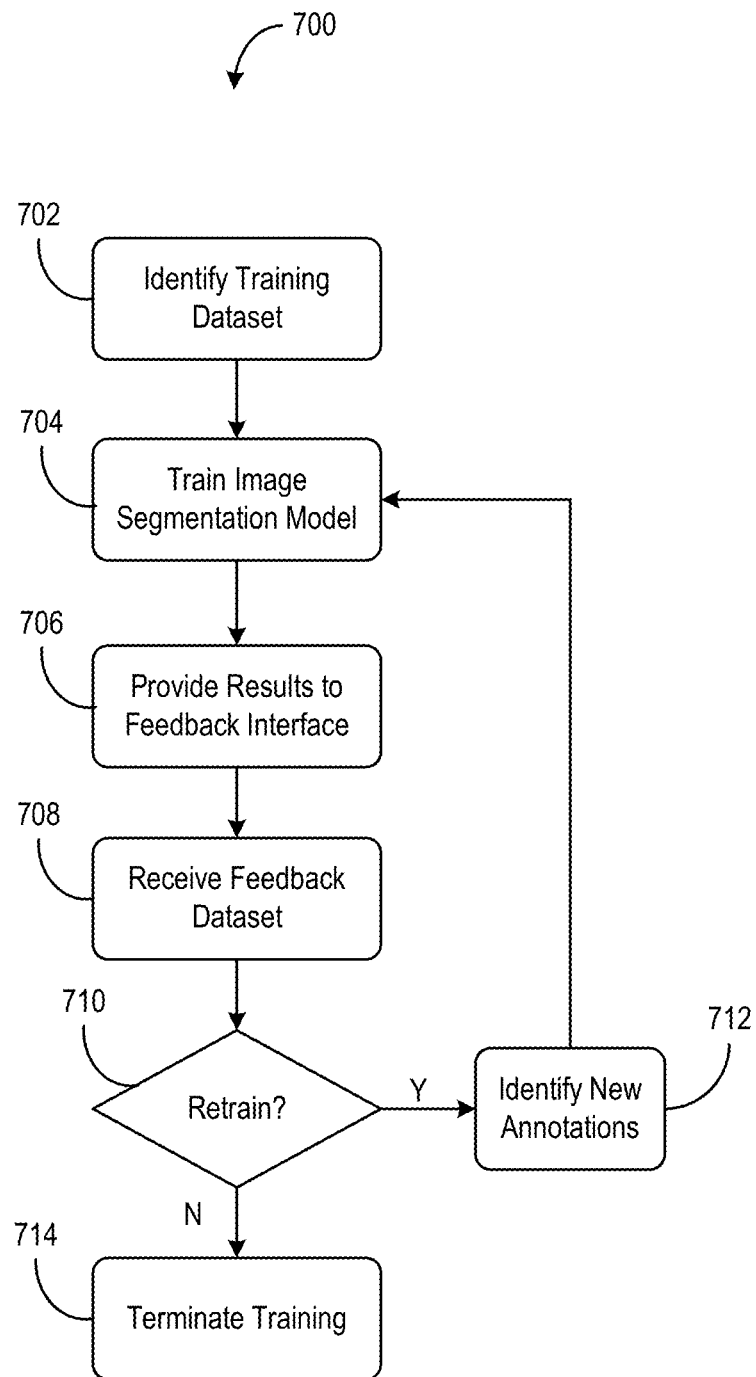
FIG. 7A depicts a flow diagram of a method of training models to segment images, in accordance with an illustrative embodiment.
Figure 7B:
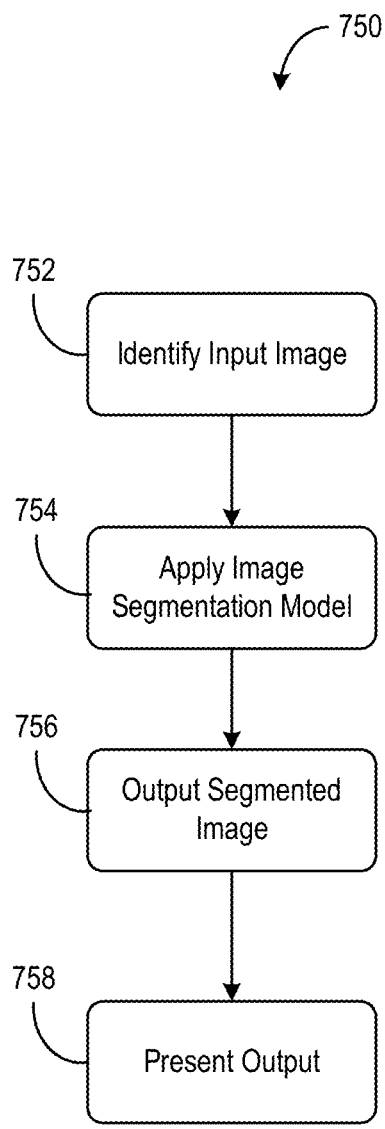
FIG. 7B depicts a flow diagram of a method of applying models to segment images, in accordance with an illustrative embodiment.

Referring to FIG. 6G, depicted is a block diagram of the image segmentation model 504 in accordance with an illustrative embodiment. The image segmentation model 504 may include a set of networks 602, such as a first network 602A, a second network 602B, and a third network 602C as depicted. Each network 602 may include or exclude components and connections described herein in conjunction with FIG. 6G. As depicted, the first network 602A may lack any cropping units 626, whereas the second network 602B and the third network 602C each may lack concatenation units 628. Although three networks 602A-C are depicted, the image segmentation model 504 may have any number of networks 602.

From outside the image segmentation model 504, each network 602 may have one of the patches at a corresponding magnification factor from one of the tiles of the image as input. The patch may be fed into the first row 620A of each network 602. For example as depicted, the patch at a first magnification factor (e.g., 20×) may be fed into the first row 620A of the first network 602A as input, the patch at a second magnification factor (e.g., 10×) may be fed into the first row 620A of the second network 602B as input, and the patch at a third magnification factor (e.g., 5×) may be fed into the first row 620A of the third network 602C as input. In addition, each network 602 itself may correspond to or be associated with one of the magnification factors. For example, the first network 602A may be associated with the first magnification factor (e.g., 20×), the second network 602B may be associated with the second magnification factor (e.g., 10×), and the third network 602C may be associated with the third magnification factor (e.g., 5×), and so forth.

In the image segmentation model 504, the inputs and outputs of the network 602 may be fed into one another. The outputs of networks 602 of lower magnification factors may be fed as inputs of the network 602 of the highest magnification factor. For example, as depicted, the resultant sets of feature maps 608' from the second network 602B (associated with a magnification factor of 10×) from each column 622 may be provided as input to concatenation units 628 of the corresponding columns 622 of the first network 602A (associated with a magnification factor of 20×). In some embodiments, the outputs of networks 602 of even lower magnification factors may be fed as inputs of the network 602 of the magnification factor with a shift 630. The shift 630 may define a transfer of output set of feature maps 608' of one column 622 from the network 602 of the lower magnification factor to another column 622 of the network 602 of the higher magnification factor as input. The shift 630 may account for discrepancies in resolutions or size for the next component to which the output set of feature maps 608' are to be fed. For example, the resultant set of feature maps 608' from each column 622 of the third network 602C may be fed as input to the concatenation units 628 in one column 622 over in the first network 602A. As illustrated, the resultant set of feature maps 608' from the third column 622C in the third network 602C may be fed as input into the second column 622B of the first network 602A.

Furthermore, at the output of the first row 620A of the first network 602A, the image segmentation model 504 may have the terminal convolution block 614. The output of the first row 620A of the first network 602A may be fed as input to the terminal convolution block 614. The transform layers 616A-N of the terminal convolution block 614 may be applied to generate a tile for the segmented image. The tile may be of the same resolution and magnification factor as the patch fed into the first network 602A. By applying the networks 602 of the image segmentation model 504 to patches from more tiles of the image, additional tiles for the segmented image may be generated.

Referring now to FIG. 8A, depicted is a flow diagram of a method 550 of training models to segment images. The method 550 may be performed by or implemented using the system 500 described herein in conjunction with FIGS. 5A-6D or the system 800 detailed herein in conjunction in Section B. A computing system may identify a training dataset (752). The computing system may train an image segmentation model (754). The computing system may provide results to a feedback interface (756). The computing system may receive a feedback dataset (758). The computing system may determine whether to retrain (760). When the determination is to retrain, the computing system may identify new annotations (762). Conversely, when the determination is not to retrain, the computing system may terminate the training (764).

In further detail, a computing system (e.g., the image segmentation system 502) may identify a training dataset (e.g., the training dataset 516) (752). The training dataset may include a set of sample images (e.g., the sample images 518) and a set of corresponding annotations (e.g., the annotations 522). Each sample image may include a region of interest (e.g., the region of interest 520) that may be at least partially labeled using the corresponding annotation for the sample image. The region of interest within the sample image may be associated with a particular condition.

The computing system may train an image segmentation model (e.g., image segmentation model 504) (754). The image segmentation model may have a set of parameters to convert an input image into a segmented output image. The computing system may use the training dataset to train the image segmentation model. For each sample image of the training dataset, the computing system may apply the image segmentation model to generate a segmented image (e.g., the segmented image 518'). The segmented image may have an area (e.g., the first area 524A or the second area 524B) determined to correspond to one of the regions of interest and have another area (e.g., the third area 524C) determined to not correspond to any of the regions of interest in the sample image. The computing system may compare the areas of the segmented image with the annotations for the corresponding sample image to determine a loss metric. Using the loss metric, the computing system may update at least one of the parameters of the image segmentation model.

The computing system may provide results to a feedback interface (e.g., the feedback interface 514) (756). The computing system may provide the segmented images for presentation on the feedback interface. The feedback interface may present the sample image and the corresponding segmented image. The feedback interface may have one or more user interface elements to indicate whether the training of the image segmentation model is satisfactory or unsatisfactory. The feedback interface may also have one or more user interface elements to select which of the sample images to include in the retraining of the image segmentation model. The feedback interface may receive new annotations (e.g., the new annotations 522') for the sample images.

The computing system may receive a feedback dataset (e.g., the feedback dataset 530) (758). The feedback dataset may be generated using the feedback interface. The feedback dataset may also include the indication of whether the training of the image segmentation model is satisfactory or unsatisfactory. The feedback dataset may include at least a subset of sample images from the training dataset. The number of sample images in the feedback dataset may be less than the original number of sample images in the training dataset. In addition, the feedback dataset may include new annotations for each of the sample images in the subset.

The computing system may determine whether to retrain (760). The computing system may identify the indicator from the feedback dataset. If the indicator identifies that the training of the image segmentation model is satisfactory, the computing system may determine to retrain the image segmentation model. When the determination is to retrain, the computing system may identify the new annotations (762). The computing system may apply each sample image from the subset in the feedback dataset to the image segmentation model, and may repeat the functionality of (754)-(760). Otherwise, when the determination is not to retrain, the computing system may terminate the training (764). The computing system may also maintain the parameters of the image segmentation model.

Referring now to FIG. 8B, depicted is a flow diagram of a method 570 of applying models to segment images. The method 570 may be performed by or implemented using the system 500 described herein in conjunction with FIGS. 5A-6D or the system 800 detailed herein in conjunction with Section B. A computing system may identify an input image (772). The computing system may apply an image segmentation model (774). The computing system may output a segmented image (776). The computing system may present an output (778).

In further detail, a computing system (e.g., the image segmentation system 502) may identify an input image (e.g., the input image 536) (772). An imager (e.g., the image acquirer 532) may acquire or generate the input image of a sample. The sample may be any object or item, such as a histological section stained using hematoxylin and eosin (H&E). The input image may have one or more regions of interest (e.g., the region of interest 520) corresponding to various features on the sample. Upon acquisition, the imager may provide the input image to the computing system.

The computing system may apply an image segmentation model (e.g., the image segmentation model 504) (774). The computing system may apply the image segmentation model the input image by processing the image through the parameters of the image segmentation model. The computing system may output a segmented image (e.g., the output image 536') (776). The segmented image may have an area (e.g., the first area 538A or the second area 538B) determined to correspond to one of the regions of interest and have another area (e.g., the third area 538C) determined to not correspond to any of the regions of interest in the sample image. The computing system may present an output (778). The computing system may provide the segmented image for presentation on a display (e.g., the display 540).

C. Computing and Network Environment

Figure 8:
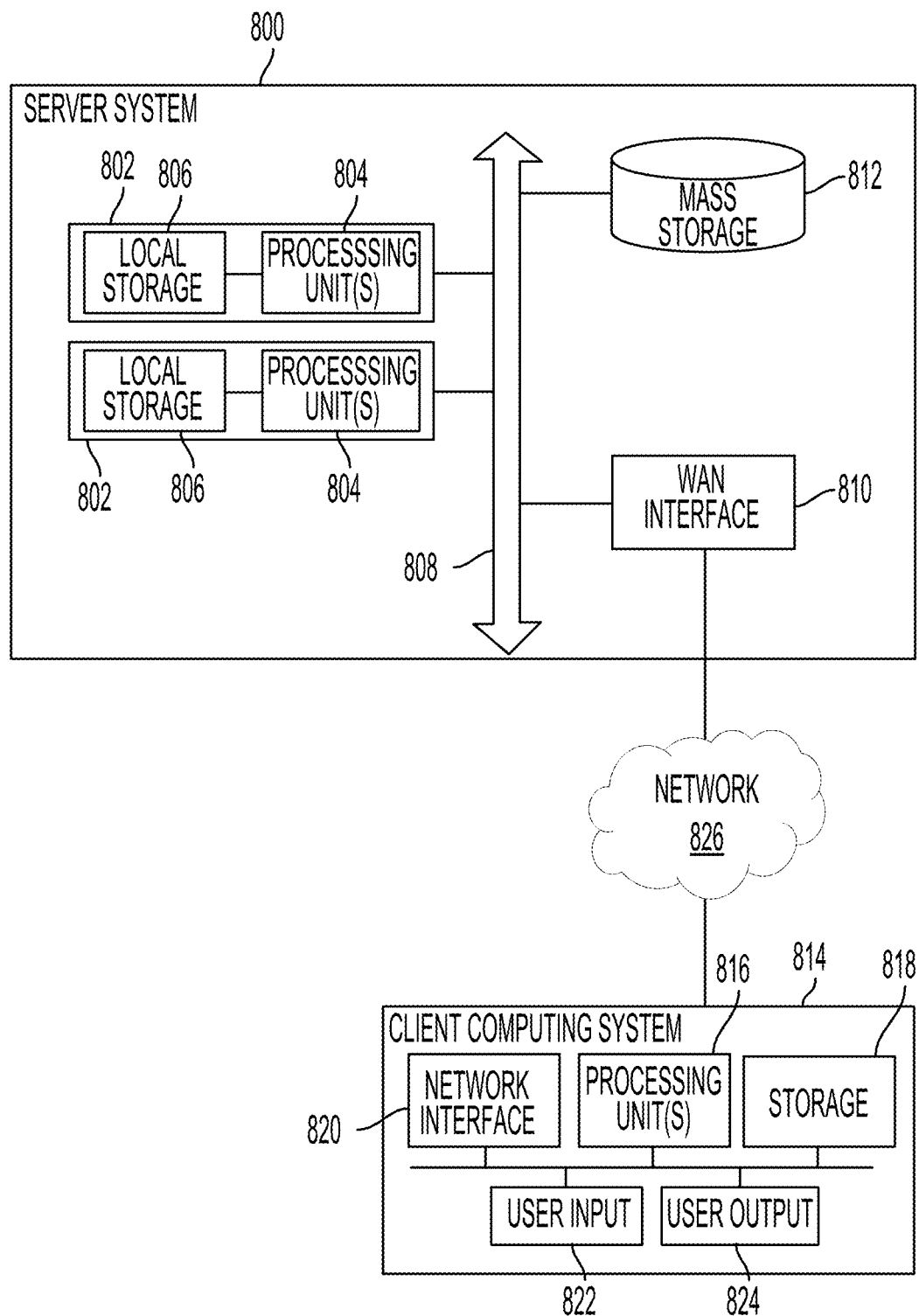
FIG. 8 depicts a block diagram of a server system and a client computer system in accordance with an illustrative embodiment.

Various operations described herein can be implemented on computer systems. FIG. 8 shows a simplified block diagram of a representative server system 800, client computer system 814, and network 826 usable to implement certain embodiments of the present disclosure. In various embodiments, server system 800 or similar systems can implement services or servers described herein or portions thereof. Client computer system 814 or similar systems can implement clients described herein. The system 600 described herein can be similar to the server system 800. Server system 800 can have a modular design that incorporates a number of modules 802 (e.g., blades in a blade server embodiment); while two modules 802 are shown, any number can be provided. Each module 802 can include processing unit(s) 804 and local storage 806.

Processing unit(s) 804 can include a single processor, which can have one or more cores, or multiple processors. In some embodiments, processing unit(s) 804 can include a general-purpose primary processor as well as one or more special-purpose co-processors such as graphics processors, digital signal processors, or the like. In some embodiments, some or all processing units 804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 804 can execute instructions stored in local storage 806. Any type of processors in any combination can be included in processing unit(s) 804.

Local storage 806 can include volatile storage media (e.g., DRAM, SRAM, SDRAM, or the like) and/or non-volatile storage media (e.g., magnetic or optical disk, flash memory, or the like). Storage media incorporated in local storage 806 can be fixed, removable or upgradeable as desired. Local storage 806 can be physically or logically divided into various subunits such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 804 need at runtime. The ROM can store static data and instructions that are needed by processing unit(s) 804. The permanent storage device can be a non-volatile read-and-write memory device that can store instructions and data even when module 802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 806 can store one or more software programs to be executed by processing unit(s) 804, such as an operating system and/or programs implementing various server functions such as functions of the system 500 of FIG. 5 or any other system described herein, or any other server(s) associated with system 500 or any other system described herein.

"Software" refers generally to sequences of instructions that, when executed by processing unit(s) 804 cause server system 800 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 804. Software can be implemented as a single program or a collection of separate programs or program modules that interact as desired. From local storage 806 (or non-local storage described below), processing unit(s) 804 can retrieve program instructions to execute and data to process in order to execute various operations described above.

In some server systems 800, multiple modules 802 can be interconnected via a bus or other interconnect 808, forming a local area network that supports communication between modules 802 and other components of server system 800. Interconnect 808 can be implemented using various technologies including server racks, hubs, routers, etc.

A wide area network (WAN) interface 810 can provide data communication capability between the local area network (interconnect 808) and the network 826, such as the Internet. Technologies can be used, including wired (e.g., Ethernet, IEEE 802.3 standards) and/or wireless technologies (e.g., Wi-Fi, IEEE 802.11 standards).

In some embodiments, local storage 806 is intended to provide working memory for processing unit(s) 804, providing fast access to programs and/or data to be processed while reducing traffic on interconnect 808. Storage for larger quantities of data can be provided on the local area network by one or more mass storage subsystems 812 that can be connected to interconnect 808. Mass storage subsystem 812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 812. In some embodiments, additional data storage resources may be accessible via WAN interface 810 (potentially with increased latency).

Server system 800 can operate in response to requests received via WAN interface 810. For example, one of modules 802 can implement a supervisory function and assign discrete tasks to other modules 802 in response to received requests. Work allocation techniques can be used. As requests are processed, results can be returned to the requester via WAN interface 810. Such operation can generally be automated. Further, in some embodiments, WAN interface 810 can connect multiple server systems 800 to each other, providing scalable systems capable of managing high volumes of activity. Other techniques for managing server systems and server farms (collections of server systems that cooperate) can be used, including dynamic resource allocation and reallocation.

Server system 800 can interact with various user-owned or user-operated devices via a wide-area network such as the Internet. An example of a user-operated device is shown in FIG. 8 as client computing system 814. Client computing system 814 can be implemented, for example, as a consumer device such as a smartphone, other mobile phone, tablet computer, wearable computing device (e.g., smart watch, eyeglasses), desktop computer, laptop computer, and so on.

For example, client computing system 814 can communicate via WAN interface 810. Client computing system 814 can include computer components such as processing unit(s) 816, storage device 818, network interface 820, user input device 822, and user output device 824. Client computing system 814 can be a computing device implemented in a variety of form factors, such as a desktop computer, laptop computer, tablet computer, smartphone, other mobile computing device, wearable computing device, or the like.

Processor 816 and storage device 818 can be similar to processing unit(s) 804 and local storage 806 described above. Suitable devices can be selected based on the demands to be placed on client computing system 814; for example, client computing system 814 can be implemented as a "thin" client with limited processing capability or as a high-powered computing device. Client computing system 814 can be provisioned with program code executable by processing unit(s) 816 to enable various interactions with server system 800.

Network interface 820 can provide a connection to the network 826, such as a wide area network (e.g., the Internet) to which WAN interface 810 of server system 800 is also connected. In various embodiments, network interface 820 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 822 can include any device (or devices) via which a user can provide signals to client computing system 814; client computing system 814 can interpret the signals as indicative of particular user requests or information. In various embodiments, user input device 822 can include any or all of a keyboard, touch pad, touch screen, mouse or other pointing device, scroll wheel, click wheel, dial, button, switch, keypad, microphone, and so on.

User output device 824 can include any device via which client computing system 814 can provide information to a user. For example, user output device 824 can include a display to display images generated by or delivered to client computing system 814. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, other user output devices 824 can be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 804 and 816 can provide various functionality for server system 800 and client computing system 814, including any of the functionality described herein as being performed by a server or client, or other functionality.

It will be appreciated that server system 800 and client computing system 814 are illustrative and that variations and modifications are possible. Computer systems used in connection with embodiments of the present disclosure can have other capabilities not specifically described here. Further, while server system 800 and client computing system 814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies including but not limited to specific examples described herein. Embodiments of the present disclosure can be realized using any combination of dedicated components and/or programmable processors and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media include magnetic disk or tape, optical storage media such as compact disk (CD) or DVD (digital versatile disk), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method of training models to segment images, comprising:
   identifying, by one or more processors, a training dataset, the training dataset including:
   a plurality of images each having a region of interest, and
   a plurality of first annotations, each of the plurality of first annotations labeling at least a first portion of the region of interest in a corresponding image of the plurality of images;
   training, by the one or more processors, using the training dataset, an image segmentation model having one or more parameters to generate a corresponding first plurality of segmented images, each of the first plurality of segmented images having a first area determined as corresponding to the region of interest and a second area determined as not corresponding to the region of interest in a corresponding image of the plurality of images;
   providing, by the one or more processors, the first plurality of segmented images generated from the training of the image segmentation model for presentation on a user interface to obtain feedback;
   receiving, by the one or more processors, via the user interface, a feedback dataset including a plurality of second annotations for at least a subset of the first plurality of segmented images, each of the plurality of second annotations labeling at least a second portion of the region of interest in a corresponding image of the subset; and
   retraining, by the one or more processors, using the feedback dataset received via the user interface, the image segmentation model to modify at least one of the one or more parameters and to generate a second plurality of segmented images corresponding to the subset.

2. The method of claim 1, further comprising:
   providing, by the one or more processors, the second plurality of segmented images generated from the retraining of the image segmentation model for presentation on the user interface for marking one or more portions in the second plurality of segmented images;
   receiving, by the one or more processors, a second feedback dataset including an indicator that retraining of the image segmentation is unsatisfactory and a plurality of third annotations for at least a subset of the second plurality of segmented images; and
   determining, by the one or more processors, in response to receiving the indicator that the retraining is unsatisfactory, to retrain the image segmentation model using the plurality of third annotations and the subset of the second plurality of segmented images.

3. The method of claim 1, further comprising:
   providing, by the one or more processors, the second plurality of segmented images generated from the retraining of the image segmentation model for presentation on the user interface for marking one or more portions in the second plurality of segmented images;
   receiving, by the one or more processors, a second feedback dataset including an indicator that retraining of the image segmentation is satisfactory; and
   determining, by the one or more processors, in response to receiving the indicator that the retraining is satisfactory, to terminate retraining of the image segmentation model and maintain the one or more parameters of the image segmentation model.

4. The method of claim 1, further comprising:
   identifying, by the one or more processors, in response to receiving an indicator that the retraining of the image segmentation model is satisfactory, a second plurality of images, each of the second plurality of images having a region of interest; and applying, by the one or more processors, the image segmentation model to the second plurality of images to generate a corresponding third plurality of segmented images, each of the third plurality of segmented images having a first area determined as corresponding to the region of interest and a second area determined as not corresponding to the region of interest.

5. The method of claim 4, further comprising:

generating, by the one or more processors, from at least one segmented image of the third plurality of segmented images, a set of image tiles each corresponding to a segment of the first area determined as corresponding to the region of interest; and providing, by the one or more processors, the set of image tiles generated from the at least one segmented image corresponding to the first area.

6. The method of claim 4, further comprising:

identifying, by the one or more processors, from at least one segmented image of the third plurality of segmented images, a number of pixels in the first area determined as corresponding to the region of interest;

comparing, by the one or more processors, the number of pixels in the first area to a threshold number for a condition associated with the region of interest; and classifying, by the one or more processors, the at least one segmented image as associated with the condition responsive to determining that the number of pixels is greater than the threshold number.

7. The method of claim 1, wherein identifying the training dataset further comprises identifying the training dataset, the training dataset including:

at least one image of the plurality of images having a plurality of regions of interest, each of the plurality of regions of interest corresponding to one of a plurality of conditions; and an annotation of the plurality of first annotations for the at least one image, the annotation labeling at least a portion of each of the regions of interest as a corresponding condition in the plurality of conditions.

8. The method of claim 1, wherein identifying the training dataset further comprises identifying the training dataset, the training dataset including:

the first plurality of images corresponding to a plurality of biomedical images, each of the plurality of biomedical images derived from a tissue sample via a histopathological image preparer, each of the plurality of biomedical images having the region of interest corresponding to a feature on the tissue sample; and the first plurality of annotations each labeling at least the first portion of the region of interest in a corresponding biomedical image of the plurality of biomedical images.

9. The method of claim 1, wherein providing the first plurality of segmented images for presentation further comprises providing the first plurality of segmented images for presentation on the user interface to indicate whether the training is satisfactory and to mark one or more portions in at least one of the first plurality of segmented images; and wherein receiving the feedback dataset further comprises receiving the feedback dataset including an indicator that the training is unsatisfactory and the second plurality of annotations generated via marking at least the subset of the first plurality of segmented images.

10. The method of claim 1, wherein training the image segmentation model further comprises establishing the image segmentation model having a set of transform layers, each transform layer of the set having the one or more parameters to process input image data.

11. A system for training models to segment images, comprising one or more processors configured to:

identify a training dataset, the training dataset including:
a plurality of images each having a region of interest, and
a plurality of first annotations, each of the plurality of first annotations labeling at least a first portion of the region of interest in a corresponding image of the plurality of images;

train, using the training dataset, an image segmentation model having one or more parameters to generate a corresponding first plurality of segmented images, each of the first plurality of segmented images having a first area determined as corresponding to the region of interest and a second area determined as not corresponding to the region of interest in a corresponding image of the plurality of images;

provide the first plurality of segmented images generated from the training of the image segmentation model for presentation on a user interface to obtain feedback;

receive, via the user interface, a feedback dataset including a plurality of second annotations for at least a subset of the first plurality of segmented images, each of the plurality of second annotations labeling at least a second portion of the region of interest in a corresponding image of the subset; and retrain using the feedback dataset received via the user interface, the image segmentation model to modify at least one of the one or more parameters and to generate a second plurality of segmented images corresponding to the subset.

12. The system of claim 11, wherein the one or more processors are further configured to: provide the second plurality of segmented images generated from the retraining of the image segmentation model for presentation on the user interface for marking one or more portions in the second plurality of segmented images;

receive a second feedback dataset including an indicator that retraining of the image segmentation is unsatisfactory and a plurality of third annotations for at least a subset of the second plurality of segmented images; and determine, in response to receiving the indicator that the retraining is unsatisfactory, to retrain the image segmentation model using the plurality of third annotations and the subset of the second plurality of segmented images.

13. The system of claim 11, wherein the one or more processors are further configured to:

provide the second plurality of segmented images generated from the retraining of the image segmentation model for presentation on the user interface for marking one or more portions in the second plurality of segmented images;

receive a second feedback dataset including an indicator that retraining of the image segmentation is satisfactory; and determine, in response to receiving the indicator that the retraining is satisfactory, to terminate retraining of the image segmentation model and maintain the one or more parameters of the image segmentation model.

14. The system of claim 11, wherein the one or more processors are further configured to:

identify, in response to receiving an indicator that the retraining of the image segmentation model is satisfactory, a second plurality of images, each of the second plurality of images having a region of interest; and apply the image segmentation model to the second plurality of images to generate a corresponding third plurality of segmented images, each of the third plurality of segmented images having a first area determined as corresponding to the region of interest and a second area determined as not corresponding to the region of interest.

15. The system of claim 14, wherein the one or more processors are further configured to:

generate, from at least one segmented image of the third plurality of segmented images, a set of image tiles each corresponding to a segment of the first area determined as corresponding to the region of interest; and provide the set of image tiles generated from the at least one segmented image corresponding to the first area.

16. The system of claim 14, wherein the one or more processors are further configured to:

identify, from at least one segmented image of the third plurality of segmented images, a number of pixels in the first area determined as corresponding to the region of interest;

compare the number of pixels in the first area to a threshold number for a condition associated with the region of interest; and classify the at least one segmented image as associated with the condition responsive to determining that the number of pixels is greater than the threshold number.

17. The system of claim 11, wherein the training dataset further includes:

at least one image of the plurality of images having a plurality of regions of interest, each of the plurality of regions of interest corresponding to one of a plurality of conditions; and an annotation of the plurality of first annotations for the at least one image, the annotation labeling at least a portion of each of the regions of interest as a corresponding condition in the plurality of conditions.

18. The system of claim 11, wherein the training dataset further includes:

the first plurality of images corresponding to a plurality of biomedical images, each of the plurality of biomedical images derived from a tissue sample via a histopathological image preparer, each of the plurality of biomedical images having the region of interest corresponding to a feature on the tissue sample; and the first plurality of annotations each labeling at least the first portion of the region of interest in a corresponding biomedical image of the plurality of biomedical images.

19. The system of claim 11, wherein the one or more processors are further configured to:

provide the first plurality of segmented images for presentation on the user interface to indicate whether the training is satisfactory and to mark one or more portions in at least one of the first plurality of segmented images; and receive the feedback dataset including an indicator that the training is unsatisfactory and the second plurality of annotations generated via marking at least the subset of the first plurality of segmented images.

20. The system of claim 11, wherein the one or more processors are further configured to establish the image segmentation model having a set of transform layers, each transform layer of the set having the one or more parameters to process input image data.

\* \* \* \* \*